United States Patent
Frenne et al.

(10) Patent No.: US 12,170,626 B2
(45) Date of Patent: Dec. 17, 2024

(54) SYSTEMS AND METHODS OF JOINT HARQ FEEDBACK FOR PDSCH TRANSMISSION OVER MULTIPLE TRPS

(71) Applicant: Telefonaktiebolaget LM Ericsson (publ), Stockholm (SE)

(72) Inventors: Mattias Frenne, Uppsala (SE); Robert Baldemair, Solna (SE); Shiwei Gao, Nepean (CA); Siva Muruganathan, Stittsville (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 344 days.

(21) Appl. No.: 17/622,345

(22) PCT Filed: Jun. 25, 2020

(86) PCT No.: PCT/IB2020/056020
§ 371 (c)(1),
(2) Date: Dec. 23, 2021

(87) PCT Pub. No.: WO2020/261174
PCT Pub. Date: Dec. 30, 2020

(65) Prior Publication Data
US 2022/0256573 A1    Aug. 11, 2022

Related U.S. Application Data

(60) Provisional application No. 62/866,408, filed on Jun. 25, 2019.

(51) Int. Cl.
*H04L 5/00* (2006.01)
*H04L 1/1812* (2023.01)
(Continued)

(52) U.S. Cl.
CPC ............ *H04L 5/001* (2013.01); *H04L 1/1812* (2013.01); *H04L 5/0051* (2013.01);
(Continued)

(58) Field of Classification Search
CPC ......... H04W 72/0446; H04W 72/1273; H04W 72/23; H04L 5/001; H04L 5/0051;
(Continued)

(56) References Cited

U.S. PATENT DOCUMENTS

2019/0103943 A1   4/2019 Wang et al.
2019/0149275 A1*  5/2019 He et al. ............... H04L 1/1819
2019/0150073 A1   5/2019 Tiirola et al.

FOREIGN PATENT DOCUMENTS

EP    3979729 A1    4/2022
WO   2018199684 A1  11/2018
(Continued)

OTHER PUBLICATIONS

Examination Report for European Patent Application No. 20744125.4, mailed Jun. 22, 2023, 7 pages.
(Continued)

*Primary Examiner* — Jianye Wu
(74) *Attorney, Agent, or Firm* — Withrow & Terranova, PLLC

(57) ABSTRACT

Systems and methods for joint Hybrid Automatic Repeat Request (HARQ) feedback for Physical Downlink Shared Channel (PDSCH) transmission over multiple TRPs are provided. In some embodiments, a method performed by a wireless device for enabling transmission feedback includes: receiving a first Transport Block (TB) and a second TB; and determining the first TB and the second TB based on a Control Resource Set (CORESET) group identifier of a CORESET over which a corresponding Downlink Control Information (DCI) scheduling the TB is received. In this
(Continued)

way, the New Radio (NR) Rel-15 procedure for type 1 HARQ codebook construction might be reused with the same or minimum increase of HARQ feedback overhead with semi-static HARQ-ACK codebook.

19 Claims, 26 Drawing Sheets

(51) Int. Cl.
  *H04L 27/26* (2006.01)
  *H04W 72/0446* (2023.01)
  *H04W 72/1273* (2023.01)
  *H04W 72/23* (2023.01)
(52) U.S. Cl.
  CPC ....... *H04L 5/0053* (2013.01); *H04W 72/0446* (2013.01); *H04W 72/1273* (2013.01); *H04W 72/23* (2023.01); *H04L 27/2602* (2013.01); *H04L 27/261* (2013.01)
(58) Field of Classification Search
  CPC ... H04L 5/0053; H04L 5/0094; H04L 5/0055; H04L 1/1812; H04L 1/1607
  See application file for complete search history.

(56) References Cited

FOREIGN PATENT DOCUMENTS

| WO | 2020034430 A1 | 2/2020 |
|---|---|---|
| WO | 2020165702 A1 | 8/2020 |

OTHER PUBLICATIONS

NTT DOCOMO, Inc, "R1-1906224: Enhancements on multi-TRP/panel transmission," 3GPP TSG RAN WG1 #97, May 13-17, 2019, Reno, Nevada, 33 pages.

OPPO, "R1-1906287: Enhancements on multi-TRP and multi-panel transmission," 3GPP TSG RAN WG1 Meeting #97. May 13-17, 2019, 12 pages.

Notice of Reasons for Refusal for Japanese Patent Application No. 2021-573601, mailed Jan. 27, 2023, 8 pages.

Official Action for Russian Patent Application No. 2022101338, mailed Aug. 23, 2022, 14 pages.

Author Unknown, "Technical Specification Group Radio Access Network; NR; Physical channels and modulation (Release 15)," Technical Specification 38.211, Version 15.5.0, Mar. 2019, 3GPP Organizational Partners, 96 pages.

Author Unknown, "Technical Specification Group Radio Access Network; NR; Multiplexing and channel coding (Release 15)," Technical Specification 38.212, Version 15.5.0, Mar. 2019, 3GPP Organizational Partners, 101 pages.

Author Unknown, "Technical Specification Group Radio Access Network; NR; Physical layer procedures for control (Release 15)," Technical Specification 38.213, Version 15.5.0, Mar. 2019, 3GPP Organizational Partners, 104 bages.

Author Unknown, "Technical Specification Group Radio Access Network; NR; Physical layer procedures for data (Release 15)," Technical Specification 38.214, Version 15.5.0, Mar. 2019, 3GPP Organizational Partners, 103 pages.

Huawei, et al., "R1-1906029: Enhancements on Multi-TRP/panel transmission," 3GPP TSG RAN WG1 #97, May 13-17, 2019, Reno, Nevada, 17 pages.

Intel Corporation, "R1-1907559: On multi-TRP/multi-panel transmission," 3GPP TSG RAN WG1 Meeting #97, May 13-17, 2019, Reno, Nevada, 21 pages.

MCC Support, "R1-1907973: Final Report of 3GPP TSG RAN WG1 #97 v1.0.0 (Reno, USA, May 13-17, 2019)," 3GPP TSG RAN WG1 Meeting #98, Aug. 26-30, 2019, Prague, Czech Republic, 5 pages.

International Search Report and Written Opinion for International Patent Application No. PCT/IB2020/056020, mailed Sep. 8, 2020, 16 pages.

Fraunhofer IIS, et al., "R1-1907054: 7.2.8.2—Enhancements on multi-TRP/panel transmission," 3GPP TSG RAN WG1 Meeting #97, May 13-17, 2019, Reno, Nevada, 5 pages.

Office Action for Japanese Patent Application No. 2021-573601, mailed Nov. 6, 2023, 7 pages.

* cited by examiner

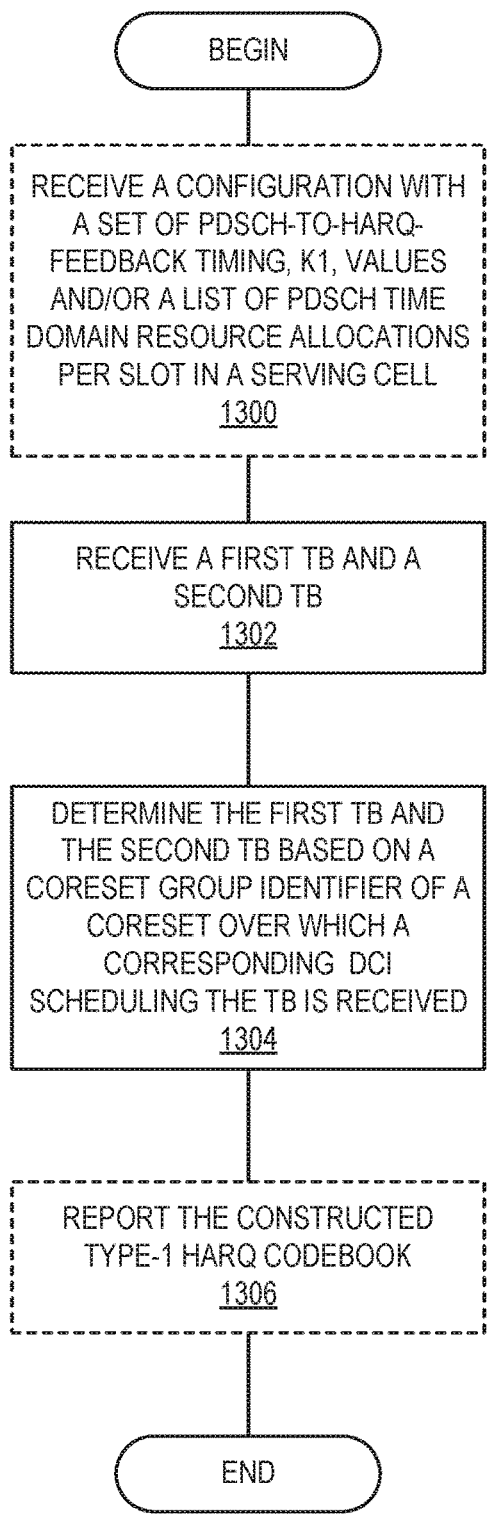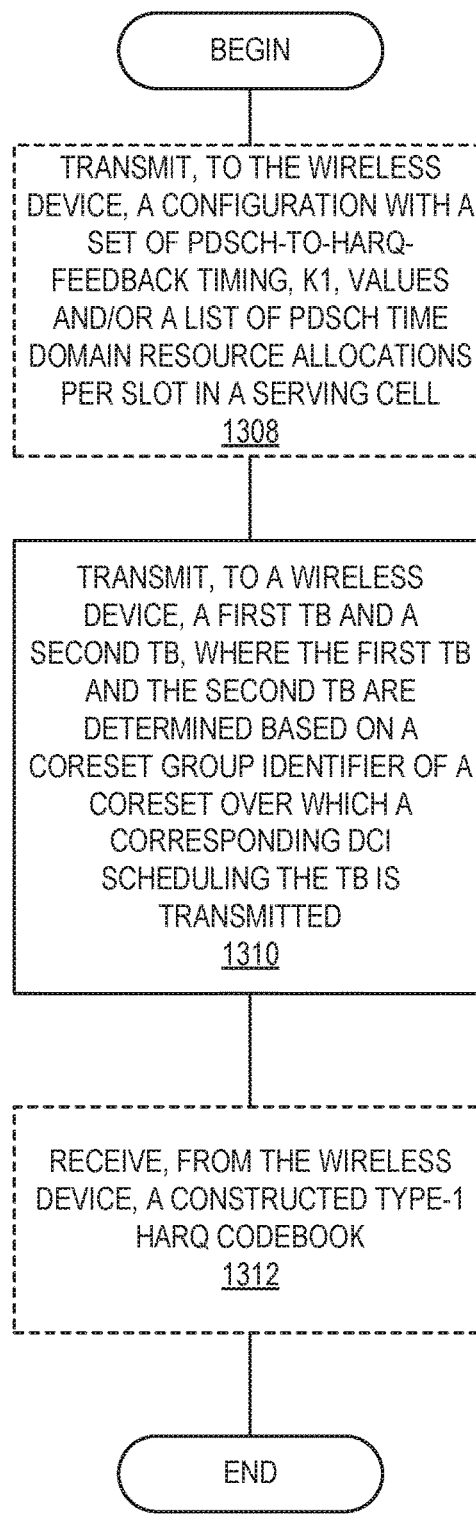
*FIG. 13A*          *FIG. 13B*

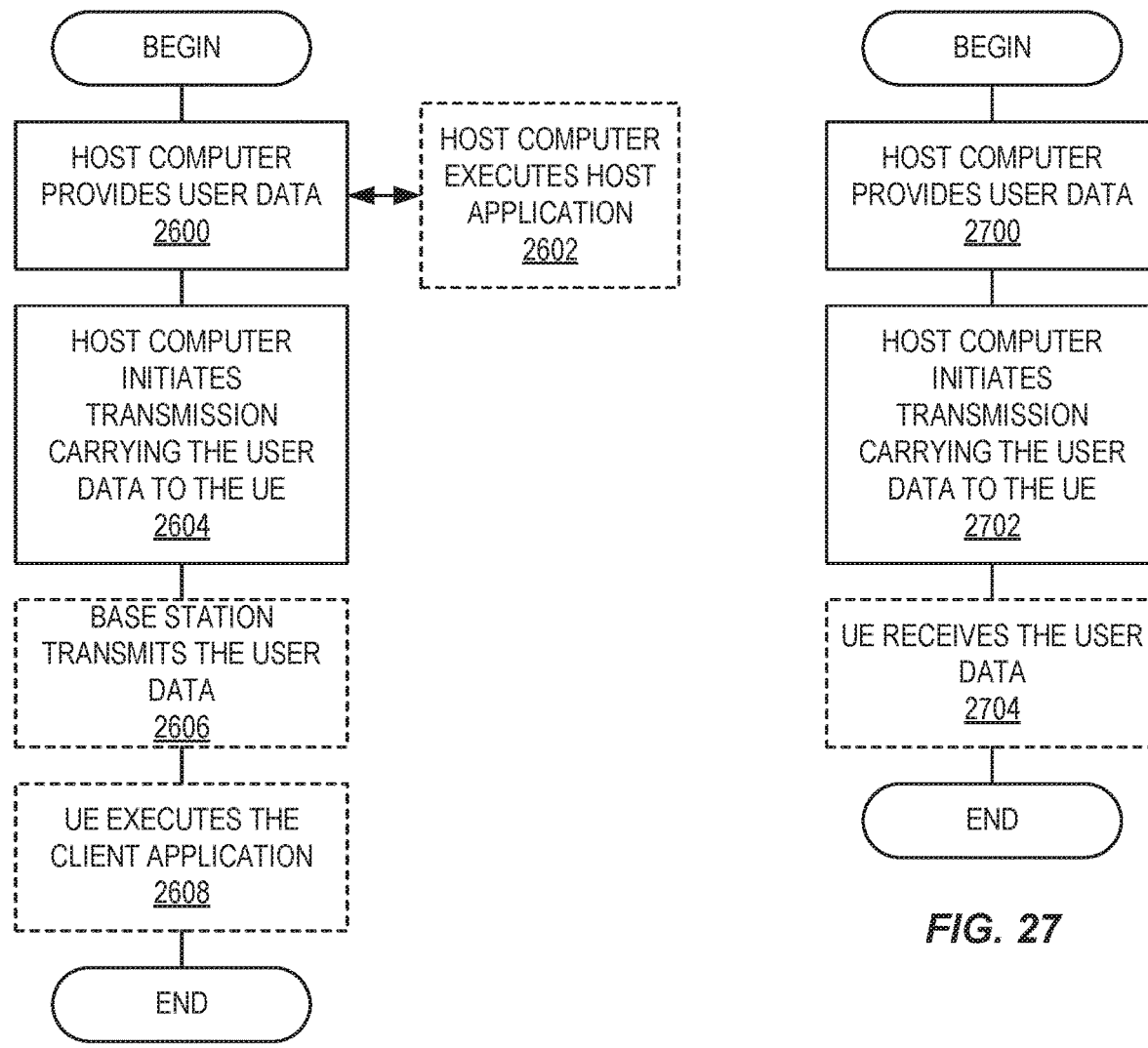

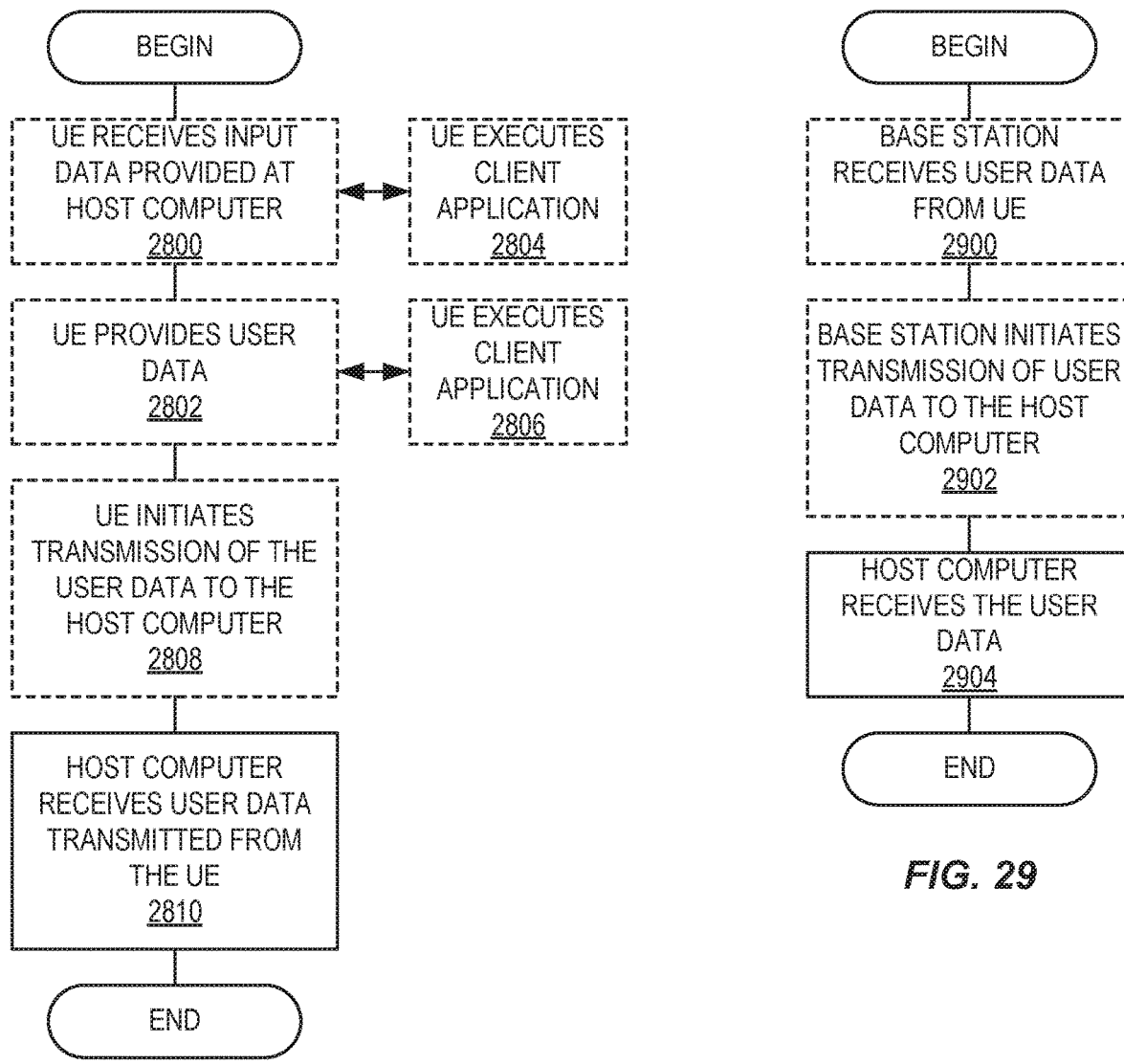

SYSTEMS AND METHODS OF JOINT HARQ FEEDBACK FOR PDSCH TRANSMISSION OVER MULTIPLE TRPS

RELATED APPLICATIONS

This application is a 35 U.S.C. § 371 national phase filing of International Application No. PCT/IB2020/056020, filed Jun. 25, 2020, which claims the benefit of provisional patent application Ser. No. 62/866,408, filed Jun. 25, 2019, the disclosures of which are hereby incorporated herein by reference in their entireties.

TECHNICAL FIELD

The present disclosure relates to Hybrid Automatic Repeat Request (HARQ) feedback.

BACKGROUND

New Radio (NR) uses Cyclic Prefix Orthogonal Frequency Division Multiplexing (CP-OFDM) in both downlink (i.e., from a network node, New Radio Base Station (gNB), or base station, to a User Equipment (UE)) and uplink (i.e., from UE to gNB). Discrete Fourier Transform (DFT) spread OFDM is also supported in the uplink. In the time domain, NR downlinks and uplinks are organized into equally-sized subframes of 1 ms each. A subframe is further divided into multiple slots of equal duration. The slot length depends on subcarrier spacing. For subcarrier spacing of Δf=15 kHz, there is only one slot per subframe and each slot consists of 14 OFDM symbols.

Data scheduling in NR is typically in slot basis. An example is shown in FIG. 1 with a 14-symbol slot, where the first two symbols contain Physical Downlink Control Channel (PDCCH) and the rest contains physical shared data channel, either Physical Downlink Shared Channel (PDSCH) or Physical Uplink Shared Channel (PUSCH).

Different subcarrier spacing values are supported in NR. The supported subcarrier spacing values (also referred to as different numerologies) are given by $\Delta f=(15 \times 2^\mu)$ kHz where $\mu \in 0, 1, 2, 3, 4$. $\Delta f=15$ kHz is the basic subcarrier spacing. The slot durations at different subcarrier spacings is given by $$\frac{1}{2^\mu} \text{ ms.}$$

In the frequency domain, a system bandwidth is divided into resource blocks (RBs), each corresponding to 12 contiguous subcarriers. The RBs are numbered starting with 0 from one end of the system bandwidth. The basic NR physical time-frequency resource grid is illustrated in FIG. 2, where only one Resource Block (RB) within a 14-symbol slot is shown. One OFDM subcarrier during one OFDM symbol interval forms one Resource Element (RE).

Downlink transmissions are dynamically scheduled, i.e., in each slot, the gNB transmits Downlink Control Information (DCI) over the PDCCH about which UE data is to be transmitted to and which RBs in the current downlink slot the data is transmitted on. The UE data are carried on PDSCH.

There are two DCI formats defined for scheduling PDSCH in NR, i.e., DCI format 1_0 and DCI format 1_1. DCI format 1-0 has a smaller size than DCI 1_1 and can be used when a UE is not fully connected to the network while DCI format 1_1 can be used for scheduling Multiple-Input-Multiple-Output (MIMO) transmissions with 2 Transport Blocks (TBs).

QCL and TCI states: Several signals can be transmitted from different antenna ports of a same base station antenna. When received at a UE, these signals can have the same large-scale properties, for instance in terms of Doppler shift and Doppler spread, average delay spread, or average delay. These antenna ports are then said to be Quasi Co-Located (QCL). In general, two quasi co-located antenna ports may not necessarily be physically co-located.

If the UE knows that two antenna ports are QCL with respect to a certain parameter (e.g., Doppler spread), the UE can estimate that parameter based on one of the antenna ports and use that estimate when receiving from the other antenna port. Typically, the first antenna port is represented by a measurement reference signal such as a Channel State Information Reference Signal (CSI-RS) or Synchronization Signal Block (SSB) (known as source RS) and the second antenna port is a Demodulation Reference Signal (DMRS) (known as target RS).

For instance, if antenna ports A and B are QCL with respect to average delay, the UE can estimate the average delay from the signal received from antenna port A (known as the source reference signal (RS)) and assume that the signal received from antenna port B (target RS) has the same average delay. This is useful for demodulation since the UE can know beforehand the properties of the channel when trying to measure the channel utilizing the DMRS, which may help the UE in for instance selecting an appropriate channel estimation filter.

Information about what assumptions can be made regarding QCL is signaled to the UE from the network. In NR, four types of QCL relations between a transmitted source RS and transmitted target RS were defined:

Type A: {Doppler shift, Doppler spread, average delay, delay spread}
Type B: {Doppler shift, Doppler spread}
Type C: {average delay, Doppler shift}
Type D: {Spatial Rx parameter}

QCL type D was introduced to facilitate beam management with analog beamforming at higher carrier frequencies (e.g., 30 GHz) and is known as spatial QCL. There is currently no strict definition of spatial QCL, but the understanding is that if two transmitted antenna ports are spatially QCL, the UE can use the same Rx beam to receive them. Note that for beam management, the discussion mostly revolves around QCL Type D, but it is also necessary to convey a Type A QCL relation for the RSs to the UE so that it can estimate all the relevant large-scale parameters.

Typically, this is achieved by configuring the UE with a CSI-RS for tracking (TRS) for time/frequency offset estimation. To be able to use any QCL reference, the UE would have to receive it with a sufficiently good Signal to Interference Plus Noise Ratio (SINR). In many cases, this means that the TRS has to be transmitted in a suitable beam to a certain UE.

To introduce dynamics in beam and Transmission Reception Point (TRP) selection, the UE can be configured through Radio Resource Control (RRC) signalling with N Transmission Configuration Indication (TCI) states, where N is up to 128 in Frequency Range 2 (FR2) and up to 8 in FR1, depending on UE capability.

Each TCI state contains QCL information, i.e., one or two source Downlink (DL) RSs, each source RS associated with a QCL type. For example, a TCI state contains a pair of reference signals, each associated with a QCL type, e-g- two different CSI-RSs {CSI-RS1, CSI-RS2} are configured in the TCI state as {qcl-Type1,qcl-Type2}={Type A, Type D}. It means the UE can derive Doppler shift, Doppler spread, average delay, delay spread from CSI-RS1 and Spatial Rx parameter (i.e., the RX beam to use) from CSI-RS2.

Each of the N states in the list of TC states can be interpreted as a list of N possible beams transmitted from the network or a list of N possible TRPs used by the network to communicate with the UE.

A first list of available TCI states is configured for PDSCH, and a second list for PDCCH contains pointers, known as TCI State IDs, to a subset of the TCI states configured for PDSCH. The network then activates one TCI state for PDCCH (i.e., provides a TCI for PDCCH) and up to eight active TCI states for PDSCH. The number of active TCI states the UE supports is a UE capability, but the maximum is eight. The TCI state(s) used for a PDSCH is dynamically indicated in DCI 1_1.

Each configured TCI state contains parameters for the quasi co-location associations between source reference signals (CSI-RS or Synchronization Signal Block (SSB)) and target reference signals (e.g., PDSCH/PDCCH DMRS ports). TCI states are also used to convey QCL information for the reception of CSI-RS.

CORESET and Search Space: A PDCCH consists of one or more Control-Channel Elements (CCEs) as indicated in Table 1 below. A CCE consists of 6 Resource-Element Groups (REGs) where a REG equals one RB during one OFDM symbol.

TABLE 1

NR supported PDCCH aggregation levels.

| Aggregation level | Number of CCEs |
|---|---|
| 1 | 1 |
| 2 | 2 |
| 4 | 4 |
| 8 | 8 |
| 16 | 16 |

A set of PDCCH candidates for a UE to monitor is defined in terms of PDCCH search space sets. A search space set can be a Common Search Space (CSS) set or a UE Specific Search Space (USS) set. A UE can be configured with up to 10 sets of search spaces per bandwidth part for monitoring PDCCH candidates.

A search space set is defined over a Control Resource Set (CORESET). A CORESET consists of $N_{RB}^{CORESET}$ resource blocks in the frequency domain and $N_{symb}^{CORESET} \in \{1,2,3\}$ consecutive OFDM symbols in the time domain. In NR Rel-15, a UE can be configured with up to 3 CORESETs per bandwidth part. For each CORESET, a UE is configured by Radio Resource Control (RRC) signaling with CORESET Information Element (IE), which includes the following
 a CORESET index p, $0 \leq p < 12$;
 a DM-RS scrambling sequence initialization value;
 a precoder granularity for a number of REGs in the frequency domain where the UE can assume use of a same DM-RS (DeModulation Reference Signal) precoder;
 a number of consecutive symbols;
 a set of resource blocks;
 CCE-to-REG mapping parameters;
 a list of up to 64 TCI-States can be configured in a CORESET p. These TCI states are used to provide QCL relationships between the source DL RS(s) in one RS Set in the TCI State and the PDCCH DMRS ports (i.e., for DMRS ports for PDCCHs received in one of the search spaces defined over CORESET p). The source DL RS(s) can either be a CSI-RS or SSB;
 an indication for a presence or absence of a transmission configuration indication (TCI) field for DCI format 1_1 transmitted by a PDCCH in CORESET p.

For each search space set, a UE is configured with the following:
 a search space set index s, $0 \leq s < 40$
 an association between the search space set s and a CORESET p
 a PDCCH monitoring periodicity of $k_s$ slots and a PDCCH monitoring offset of $o_s$ slots
 a PDCCH monitoring pattern within a slot, indicating first symbol(s) of the CORESET within a slot for PDCCH monitoring
 a duration of $T_s < k_s$ slots indicating a number of slots that the search space set s exists
 a number of PDCCH candidates $M_s^{(L)}$ per CCE aggregation level L
 an indication that search space set s is either a CSS set or a USS set
 DCI formats to monitoring For search space set s, the UE determines that a PDCCH monitoring occasion(s) exists in a slot with slot number $n_{s,f}^\mu$ in a frame with frame number $n_f$ if $(n_f N_{slot}^{frame,\mu} + n_{s,f}^\mu - o_s)$ mod $k_s = 0$. The UE monitors the PDCCH for search space set s for $T_s$ consecutive slots, starting from slot $n_{s,f}^\mu$, and does not monitor the PDCCH for search space set s for the next $k_s - T_s$ consecutive slots.

A UE first detects and decodes the PDCCH and if the decoding is successful, it then decodes the corresponding PDSCH based on the decoded control information in the PDCCH. When a PDSCH is successfully decoded, the HARQ (Hybrid ARQ) ACK is sent to the gNB over the Physical Uplink Control Channel (PUCCH). Otherwise, a HARQ Negative Acknowledgement (NACK) is sent to the gNB over the PUCCH so that data can be retransmitted to the UE. If the PUCCH overlaps with a PUSCH transmission, HARQ feedback can also be conveyed on the PUSCH.

Uplink data transmissions are also dynamically scheduled using the PDCCH. Similar to downlink, a UE first decodes uplink grants in the PDCCH and then transmits data over the PUSCH based the decoded control information in the uplink grant such as modulation order, coding rate, uplink resource allocation, etc.

DCI format 1_1 is used for the scheduling of the PDSCH in one cell. The following information is transmitted by means of the DCI format 1-1 with a Cyclic Redundancy Check (CRC) scrambled by Cell-Radio Network Temporary Identifier (C-RNTI) or Configured Scheduling-Radio Network Temporary Identifier (CS-RNTI) or Modulation and Coding Scheme (MCS)-C-RNTI:
 Identifier for DCI formats
 Carrier indicator
 Bandwidth part indicator
 Frequency domain resource assignment
 Time domain resource assignment (TDRA)-0, 1, 2, 3, or 4 bits as defined in Subclause 5.1.2.1 of 3GPP TS 38.214. The bit width for this field is determined as $\lceil \log_2(I) \rceil$ bits, where I is the number of entries in the higher layer parameter pdsch-TimeDomainAllocation-List if the higher layer parameter is configured; otherwise I is the number of entries in the default table.

Virtual Resource Block (VRB)-to-Physical Resource Block (PRB) mapping
PRB bundling size indicator
Rate matching indicator
Zero Power (ZP) CSI-RS trigger
For transport block 1:
Modulation and coding scheme—5 bits ($I_{MCS}$)
New data indicator (NDI)—1 bit
Redundancy version—2 bits ($rv_{id}$)
For transport block 2 (only present if maxNrofCodeWordsScheduledByDCI equals 2):
Modulation and coding scheme—5 bits ($I_{MCS}$)
New data indicator (NDI)—1 bit
Redundancy version—2 bits ($rv_{id}$)
HARQ process number
Downlink assignment index (DAI)
Transmit Power Control (TPC) command for scheduled PUCCH
PUCCH resource indicator (PRI)
PDSCH-to-HARQ_feedback timing indicator (K1)—0, 1, 2, or 3 bits as defined in Subclause 9.2.3 of 3GPP TS 38.213. The bit width for this field is determined as $\lceil \log_2(I) \rceil$ bits, where I is the number of entries in the higher layer parameter dl-DataToUL-ACK.
Antenna port(s)—4, 5, or 6 bits as defined by Tables 7.3.1.2.2-1/2/3/4 of 3GPP TS38.212
Transmission configuration indication (TCI)—0 bit if higher layer parameter tci-PresentInDCI is not enabled; otherwise 3 bits as defined in Subclause 5.1.5 of 3GPP TS38.214.
Sounding Reference Signal request
Code Block Group (CBG) transmission information
CBG flushing out information
DMRS sequence initialization—1 bit.

PDSCH Resource Allocation in Time Domain

When the UE is scheduled to receive PDSCH by a DCI, the Time domain resource assignment (TDRA) field value m of the DCI provides a row index m+1 to an allocation table. The determination of the used resource allocation table is defined in sub-clause 5.1.2.1.1 of 3GPP TS38.214 v15.5.0, where either a default PDSCH time domain allocation A, B or C according to tables 5.1.2.1.1-2, 5.1.2.1.1-3, 5.1.2.1.1-4 and 5.1.2.1.1-5 is applied, or the higher layer configured parameter pdsch-TimeDomainAllocationList in either pdsch-ConfigCommon or pdsch-Config is applied. Table 5.1.2.1.1-2 of 3GPP TS38.214 v15.5.0 is copied below.

TABLE 5.1.2.1.1-2

Default PDSCH time domain resource allocation A for normal CP

| Row index | dmrs-TypeA-Position | PDSCH mapping type | $K_0$ | S | L |
|---|---|---|---|---|---|
| 1 | 2 | Type A | 0 | 2 | 12 |
|   | 3 | Type A | 0 | 3 | 11 |
| 2 | 2 | Type A | 0 | 2 | 10 |
|   | 3 | Type A | 0 | 3 | 9 |
| 3 | 2 | Type A | 0 | 2 | 9 |
|   | 3 | Type A | 0 | 3 | 8 |
| 4 | 2 | Type A | 0 | 2 | 7 |
|   | 3 | Type A | 0 | 3 | 6 |
| 5 | 2 | Type A | 0 | 2 | 5 |
|   | 3 | Type A | 0 | 3 | 4 |
| 6 | 2 | Type B | 0 | 9 | 4 |
|   | 3 | Type B | 0 | 10 | 4 |
| 7 | 2 | Type B | 0 | 4 | 4 |
|   | 3 | Type B | 0 | 6 | 4 |
| 8 | 2, 3 | Type B | 0 | 5 | 7 |
| 9 | 2, 3 | Type B | 0 | 5 | 2 |
| 10 | 2, 3 | Type B | 0 | 9 | 2 |
| 11 | 2, 3 | Type B | 0 | 12 | 2 |
| 12 | 2, 3 | Type A | 0 | 1 | 13 |
| 13 | 2, 3 | Type A | 0 | 1 | 6 |
| 14 | 2, 3 | Type A | 0 | 2 | 4 |
| 15 | 2, 3 | Type B | 0 | 4 | 7 |
| 16 | 2, 3 | Type B | 0 | 8 | 4 |

The indexed row defines the slot offset K0, the start symbol S, and the allocation length L in case that a default table is used, and the PDSCH mapping type to be assumed in the PDSCH reception. Either Type A (i.e., slot based PDSCH transmission) or Type B (i.e., mini-slot based PDSCH transmission) may be indicated. In case that pdsch-TimeDomainAllocationList is configured, the pdsch-TimeDomainAllocationList contains a list of PDSCH-Time Domain Resource Allocation Information Elements (IEs) as shown below, where the start symbol S and the allocation length L is jointly encoded in startSymbolAndLength as the start and length indicator SLIV.

```
PDSCH-TimeDomainResourceAllocation ::= SEQUENCE {
  k0                   INTEGER(0..32)
  mappingType          ENUMERATED {typeA, typeB},
  startSymbolAndLength INTEGER (0..127)
}
```

The valid S and L values are shown in the table below.

TABLE 5.1.2.1-1

Valid S and L combinations (3gpp TS38.214 v15.5.0)

| PDSCH mapping type | Normal cyclic prefix | | | Extended cyclic prefix | | |
|---|---|---|---|---|---|---|
| | S | L | S + L | S | L | S + L |
| Type A | {0, 1, 2, 3} (Note 1) | {3, . . . , 14} | {3, . . . , 14} | {0, 1, 2, 3} (Note 1) | {3, . . . , 12} | {3, . . . , 12} |
| Type B | {0, . . . , 12} | {2, 4, 7} | {2, . . . , 14} | {0, . . . , 10} | {2, 4, 6} | {2, . . . , 12} |

Note 1:
S = 3 is applicable only if dmrs-TypeA-Position = 3

Note that for Type A PDSCH, the TDRAs in the pdsch-TimeDomainAllocationList or the default table are overlapping and only one PDSCH can be scheduled in a slot per cell in NR Release 15. For Type B PDSCH, the TDRAs in the pdsch-TimeDomainAllocationList or the default table may be non-overlapping and thus more than one PDSCH may be scheduled in a slot. FIG. 3 shows some examples, where in FIG. 3D two type B PDSCHs are scheduled in a slot.

NR MIMO Data Transmission: NR data transmission over multiple MIMO layers is shown in FIG. 4. Depending on the total number of MIMO layers or the rank, either one Codeword (CW) or two codewords are used. In NR Release-15, one codeword is used when the total number of layers is equal to or less than 4, two codewords are used when the number of layers is more than 4. Each codeword contains the encoded data bits of a Transport Block (TB). After bit level scrambling, the scrambled bits are mapped to complex-valued modulation symbols $d^{(q)}(0), \ldots, d^{(q)}(M_{symb}^{(q)}-1)$ for codeword q, $q \in (0,1)$. The complex-valued modulation symbols are then mapped onto the layers $x(i)=[x^{(0)}(i) \ldots x^{(v-1)}(i)]^T$, $i=0, 1, \ldots, M_{symb}^{layer}-1$, according to Table 7.3.1.3-1 of 3GPP TS 38.211 v15.5.0.

For the purpose of demodulation, a demodulation reference signal (DMRS), also referred to as a DMRS port, is transmitted along each data layer. The block of vectors $[x^{(0)}(i) \ldots x^{(v-1)}(i)]^T$, $i=0, 1, \ldots, M_{symb}^{layer}-1$ shall be mapped to DMRS antenna ports according to $$\begin{bmatrix} y^{(p_0)}(i) \\ \vdots \\ y^{(p_{v-1})}(i) \end{bmatrix} = \begin{bmatrix} x^{(0)}(i) \\ \vdots \\ x^{(v-1)}(i) \end{bmatrix}$$

where $i=0, 1, \ldots, M_{symb}^{ap}-1$, $M_{symb}^{ap}=M_{symb}^{layer}$. The set of DMRS antenna ports $\{p_0, \ldots, p_{v-1}\}$ and port to layer mapping are dynamically indicated in DCI according to Tables 7.3.1.2.2-1/2/3/4 in 3GPP TS 38.212 v15.5.0.

The maximum number of TBs or codewords that can be scheduled by DCI format 1-1 is configured by a higher layer parameter maxNrofCodeWordsScheduledByDCI. Using this parameter, either 1 or 2 codewords can be configured. In case the higher layer parameter maxNrofCodeWordsScheduledByDCI indicates that two codeword transmission is enabled, then one of the two transport blocks is disabled by DCI format 1-1 if $I_{MCS}=26$ and if $rv_{id}=1$ for the corresponding transport block, where $I_{MCS}$ is the MCS (modulation and coding scheme) index and $rv_{id}$ is the redundancy version, both indicated in DCI 1_1. If both transport blocks are enabled, transport block 1 and 2 are mapped to codeword 0 and 1 respectively. If only one transport block is enabled, then the enabled transport block is always mapped to the first codeword.

DMRS Code Division Multiplexing (CDM) groups: The mapping of DMRS to resource elements is configurable in both frequency and time domain. There are two mapping types in the frequency domain, i.e., configuration type 1 or type 2. For each OFDM symbol configured for DMRS, there are two Code Division Multiplexing (CDM) groups for Type 1 and three CDM groups for Type 2 DMRS. An example is shown in FIG. 5, where one front-loaded DMRS symbol is configured.

DMRS ports to CDM group mappings are shown in Table 2 and Table 3 for configuration type 1 and type 2, respectively.

TABLE 2

PDSCH DMRS port to CDM group mapping, configuration type 1.

| p | CDM group λ |
|---|---|
| 1000 | 0 |
| 1001 | 0 |
| 1002 | 1 |
| 1003 | 1 |
| 1004 | 0 |
| 1005 | 0 |
| 1006 | 1 |
| 1007 | 1 |

TABLE 3

PDSCH DMRS port to CDM group mapping, configuration type 2.

| p | CDM group λ |
|---|---|
| 1000 | 0 |
| 1001 | 0 |
| 1002 | 1 |
| 1003 | 1 |
| 1004 | 2 |
| 1005 | 2 |
| 1006 | 0 |
| 1007 | 0 |
| 1008 | 1 |
| 1009 | 1 |
| 1010 | 2 |
| 1011 | 2 |

NR HARQ ACK/NACK feedback over PUCCH: When receiving a PDSCH in the downlink from a serving gNB at slot n, a UE feeds back a Hybrid Automatic Repeat Request (HARQ) ACK at slot n+k over a PUCCH (Physical Uplink Control Channel) resource in the uplink to the gNB if the PDSCH is decoded successfully, otherwise, the UE sends a HARQ NACK at slot n+k to the gNB to indicate that the PDSCH is not decoded successfully. If two TBs are carried by the PDSCH, then a HARQ ACK/NACK is reported for each TB so that if one TB is not decoded successfully, only that TB needs to be retransmitted by the gNB. Spatial bundling can be configured, in which case the logical AND of the decoding states of TB1 and TB2 is fed back. k is also referred to as $K_1$ in 3GPP specifications.

For DCI format 1-0, k is indicated by a 3-bit PDSCH-to-HARQ-timing-indicator field. For DCI format 1-1, k is indicated either by a 3-bit PDSCH-to-HARQ-timing-indicator field, if present, or by higher layer through Radio Resource Control (RRC) signaling.

If Code Block Group (CBG) transmission is configured, a HARQ ACK/NACK for each CBG in a TB is reported instead.

In case of carrier aggregation (CA) with multiple component carriers (CCs) and/or Time Division Duplexing (TDD) operation, multiple aggregated HARQ ACK/NACK bits need to be sent in a single PUCCH resource.

In NR, up to four PUCCH resource sets can be configured to a UE. A PUCCH resource set with pucch-ResourceSetId=0 can have up to 32 PUCCH resources while for PUCCH resource sets with pucch-ResourceSetId=1 to 3, each set can have up to 8 PUCCH resources. A UE determines the PUCCH resource set in a slot based on the number of aggregated UCI (Uplink Control Information) bits to be sent in the slot. The UCI bits consist of HARQ ACK/NACK, scheduling request (SR), and channel state information (CSI) bits.

If the UE transmits $O_{UCI}$ UCI information bits, the UE determines a PUCCH resource set to be
- a first set of PUCCH resources with pucch-ResourceSetId=0 if $O_{UCI} \leq 2$ including 1 or 2 HARQ-ACK information bits and a positive or negative SR on one SR transmission occasion if transmission of HARQ-ACK information and SR occurs simultaneously, or
- a second set of PUCCH resources with pucch-ResourceSetId=1, if provided by higher layers, if $2 < O_{UCI} \leq N_2$, or
- a third set of PUCCH resources with pucch-ResourceSetId=2, if provided by higher layers, if $N_2 < O_{UCI} \leq N_3$, or
- a fourth set of PUCCH resources with pucch-ResourceSetId=3, if provided by higher layers, if $N_3 < O_{UCI} \leq 1706$.

Where $N_1 < N_2 < N_3$ are provided by higher layers.

For a PUCCH transmission with HARQ-ACK information, a UE determines a PUCCH resource after determining a PUCCH resource set. The PUCCH resource determination is based on a 3-bit PUCCH resource indicator (PRI) field in DCI format 1_0 or DC format 1_1.

If more than one DCI format 1_0 or 1_1 are received in the case of CA and/or Time Division Duplexing (TDD), the PUCCH resource determination is based on a PUCCH resource indicator (PRI) field in the last DCI format 1_0 or DCI format 1-1 among the multiple received DCI format 1_0 or DCI format 1-1 that the UE detects. The multiple received DCI format 1_0 or DCI format 1_1 has a value of a PDSCH-to-HARQ_feedback timing indicator field indicating a same slot for the PUCCH transmission. For PUCCH resource determination, detected DCI formats are first indexed in an ascending order across serving cells indexes for a same PDCCH monitoring occasion and are then indexed in an ascending order across PDCCH monitoring occasion indexes.

The 3 bit PRI field maps to a PUCCH resource in a set of PUCCH resources with a maximum of eight PUCCH resources. For the first set of PUCCH resources with pucch-ResourceSetId=0 and when the number of PUCCH resources, $R_{PUCCH}$, in the set is larger than eight, the UE determines a PUCCH resource with index $r_{PUCCH}$, $0 \leq r_{PUCCH} \leq R_{PUCCH} - 1$, for carrying HARQ-ACK information in response to detecting a last DCI format 1_0 or DCI format 1_1 in a PDCCH reception, among DCI formats 1_0 or DCI formats 1_1 the UE received with a value of the PDSCH-to-HARQ_feedback timing indicator field indicating a same slot for the PUCCH transmission, as $$r_{PUCCH} = \begin{cases} \left\lfloor \frac{n_{CCE,p} \cdot \lceil R_{PUCCH}/8 \rceil}{N_{CCE,p}} \right\rfloor + \Delta_{PRI} \cdot \left\lceil \frac{R_{PUCCH}}{8} \right\rceil & \text{if } \Delta_{PRI} < R_{PUCCH} \bmod 8 \\ \left\lfloor \frac{n_{CCE,p} \cdot \lfloor R_{PUCCH}/8 \rfloor}{N_{CCE,p}} \right\rfloor + \Delta_{PRI} \cdot \left\lfloor \frac{R_{PUCCH}}{8} \right\rfloor + R_{PUCCH} \bmod 8 & \text{if } \Delta_{PRI} \geq R_{PUCCH} \bmod 8 \end{cases}$$

where $N_{CCE,p}$ is a number of CCEs in CORESET p of the PDCCH reception for the DCI format 1_0 or DCI format 1_1 as described in Subclause 10.1 of 3gpp TS38.213 v15.4.0, $n_{CCE,p}$ is the index of a first CCE for the PDCCH reception, and $\Delta_{PRI}$ is a value of the PUCCH resource indicator field in the DCI format 1_0 or DCI format 1_1.

NR Rel-15 supports two types of HARQ codebooks, i.e., semi-static (type 1) and dynamic (type 2) codebooks, for HARQ ACK/NACK multiplexing for multiple PDSCHs of one or more CCs. A UE can be configured to use either one of the codebooks for HARQ ACK/NACK feedback.

NR Type-1 HARQ-ACK codebook determination: HARQ codebook (CB) size in time (DL association set) is determined based on the configured set of HARQ-ACK timings K1, and semi-static configured TDD pattern in case of TDD.

An example is shown in FIG. 6 for a TDD pattern with a set of K1 from 1 to 5 and a configured time-domain resource allocation table or the pdsch-TimeDomainAllocationList without non-overlapping PDSCH TDRA allocation, i.e., only one PDSCH can be scheduled in a slot. In this case, there are 5 entries in the HARQ codebook, one for each K1 value. For slots without PDSCH transmission or slots where PDCCH for PDSCH scheduling is not detected by a UE, the corresponding entry in the codebook is filled with NACK ("N" shown in the figure). For slots in which PDSCH is scheduled, the corresponding entry is filled with either ACK or NACK depending on whether the PDSCH is successfully decoded or not ("X" shown in the figure).

If UE supports reception of more than one unicast PDSCH per slot, one HARQ codebook entry for each non-overlapping time-domain resource allocation in the pdsch-symbolAllocation table is reserved per slot; otherwise one HARQ entry is reserved per slot.

In case of MIMO with up to two codewords, an additional entry is added for each K1 value. In case of multiple CCs, additional entries in the HARQ codebook are added for each CC. In component carrier dimension, HARQ codebook size is given by configured number of DL cells and the max number of HARQ feedback bits based on configuration per DL cell (e.g., MIMO, spatial bundling, configured number of Code Block Groups (CBGs) per TB). An example is shown in FIG. 7, where a semi-static HARQ codebook for a UE is configured with three cells, i.e., cells 1 to 3. Cell 1 is configured with up to 2 TBs per PDSCH, cell 2 with 1 TB per PDSCH, and cell 3 with 1 TB and 4 CBG. For each K1 value, the UE needs to feedback 7 bits, i.e., 2 bits for cell 1, 1 bit for cell 2, and 4 bits for cell 3 (not considering potential multiple entries per slot based on the pdsch-symbolAllocation table). The rows and columns shown in the figure are for illustration purposes; the actual feedback is a single bit vector by arranging the bits in certain order.

Non-coherent Joint Transmission (NC-JT) over multiple Transmission Reception Points or panels (TRP): NC-JT refers to MIMO data transmission over multiple TRPs in which different MIMO layers are transmitted over different TRPs. An example is shown in FIG. 8, where data are sent to a UE over two TRPs, each TRP carrying one TB mapped to one code word. When the UE has 4 receive antennas while each of the TRPs has only 2 transmit antennas, the UE can support up to 4 MIMO layers but each TRP can maximally transmit 2 MIMO layers. In this case, by transmitting data over two TRPs to the UE, the peak data rate to the UE can be increased as up to 4 aggregated layers from the two TRPs can be used. This is beneficial when the traffic load, and thus the resource utilization, is low in each TRP. In this example, a single scheduler is used to schedule data over the two TRPs. One PDCCH is transmitted from each of the two TRPs in a slot, each schedules one PDSCH. This is referred to as a multi-PDCCH or multi-DCI scheme in which a UE receives two PDCCHs and the associated two PDSCHs in a slot from two TRPs. The two PDSCHs are typically allocated with the same time/frequency resource.

In another scenario shown in FIG. 9, independent schedulers are used in each TRP. In this case, only semi-static to semi-dynamic coordination between the two schedulers can be done due the non-ideal backhaul, i.e., backhaul with large delay and/or delay variations which are comparable to the cyclic prefix length or in some cases even longer, up to several milliseconds.

In 3GPP RAN1 ad hoc meeting NR_AH_1901, an agreement was reached that for multi-PDCCH based multi-TRP/panel downlink transmission for Enhanced Mobile Broad Band (eMBB), separate ACK/NACK payload/feedback for multiple received PDSCHs is supported. In addition, it was agreed that for multi-DCI based multi-TRP/panel transmission, the total number of CWs in scheduled PDSCHs, each of which is scheduled by one PDCCH, is up to 2, if resource allocation of PDSCHs are overlapped.

In 3GPP RAN1 #96, it was agreed that for separate ACK/NACK payload/feedback for received PDSCHs where multiple DCIs are used, PUCCH resources conveying ACK/NACK feedback can be Time Domain Multiplexed (TDMed) with separated HARQ-ACK codebook.

In RAN1 #96bis, it was further agreed that for separate ACK/NACK payload/feedbacks for received PDSCHs where multiple DCIs are used, support would be provided for TDMed PUCCH transmission within a slot to convey, at least separate ACK/NACK only feedback, with separated HARQ-ACK codebook for two TRPs.

In RAN1 #97, it was agreed that for separate ACK/NACK feedback for PDSCHs received from different TRPs, the UE should be able to generate separate ACK/NACK codebooks identified by an index, if the index is configured and applied across all CCs. The index to be used to generate separated ACK/NACK codebook is a higher layer signaling index per CORESET. In addition, it was agreed that joint HARQ-ACK feedback for PDSCHs received from different TRPs where multiple DCIs are used will also be supported.

There currently exist certain challenges. For joint HARQ-ACK feedback for PDSCHs received from different TRPs where multiple DCIs are used, there is a need to determine how to construct the semi-static HARQ codebook. In particular, there is a need to determine how to multiplex A/N bits associated with two PDSCHs.

SUMMARY

Systems and methods for joint Hybrid Automatic Repeat Request (HARQ) feedback for Physical Downlink Shared Channel (PDSCH) transmission over multiple TRPs are provided. In some embodiments, a method performed by a wireless device for enabling transmission feedback includes: receiving a first Transport Block (TB) and a second TB; and determining the first TB and the second TB based on a Control Resource Set (CORESET) group identifier of a CORESET over which a corresponding Downlink Control Information (DCI) scheduling the TB is received. In this way, the New Radio (NR) Rel-15 procedure for type 1 HARQ codebook construction might be reused with the same or minimum increase of HARQ feedback overhead with semi-static HARQ-ACK codebook.

In some embodiments, the method also includes, prior to receiving the first TB and the second TB, receiving a configuration with a set of PDSCH-to-HARQ-feedback timing, K1, values and/or a list of PDSCH time domain resource allocations per slot in a serving cell.

In some embodiments, the method also includes, prior to receiving the first TB and the second TB, receiving an indication to allocate two entries, a first entry and a second entry, in a type-1 HARQ codebook for each of the configured K1 values and each set of overlapping PDSCH time domain resource assignments.

In some embodiments, the method also includes mapping a HARQ-ACK bit for the first TB to the first entry and a HARQ-ACK bit for the second TB to the second entry in the Type-1 HARQ-ACK codebook associated with the same K1 value and the same time domain resource allocation.

In some embodiments, the method also includes reporting the constructed Type-1 HARQ codebook.

In some embodiments, receiving the first TB and the second TB comprises receiving in a slot the first TB, from a first Transmission Reception Point (TRP) and the second TB from a second TRP, wherein the first and the second TB are scheduled with two DCIs, one for each TB, and with a same time domain resource allocation and a same K1 value.

In some embodiments, receiving the indication to allocate two entries can be either explicit or implicit.

In some embodiments, receiving the indication to allocate two entries comprises receiving one or more of the group consisting of: a higher layer parameter maxNrofCodeWordsScheduledByDCI=2; a higher layer parameter indicating joint HARQ ACK feedback and a configuration of two CORESET groups each with a different group identifier value per CORESET for HARQ-ACK reporting; and a configuration of one CORESET group each with a same group identifier value per CORESET for HARQ-ACK reporting.

In some embodiments, the first or the second entry is filled with NACK if the first or the second TB is not received, respectively. In some embodiments, the transmitting may further comprise transmitting one or two TBs scheduled by a single DCI. In some embodiments, the first TB corresponds to transport block 1 and the second TB corresponds to transport block 2 as indicated in the DCI. In some embodiments, the wireless device is a New Radio (NR) User Equipment (UE).

In some embodiments, determining the first TB and the second TB also includes determining the first TB and the second TB based on one or more of the group consisting of: a Demodulation Reference Signal (DMRS) Code Division Multiplexing (CDM) group identifier of one or more DMRS ports indicated in a corresponding DCI scheduling the TB; a TB identifier indicated in a corresponding DCI scheduling the TB; a Transmission Configuration Indication (TCI) state identifier indicated in a corresponding DCI scheduling the TB; a TCI state identifier of a CORESET over which a corresponding DCI scheduling the TB is received; and a scrambling identifier of a PDSCH carrying the TB.

In some embodiments, a method performed by a base station for enabling transmission feedback includes: transmitting, to a wireless device, a first TB and a second TB, where the first TB and the second TB are determined based on a CORESET group identifier of a CORESET over which a corresponding DCI scheduling the TB is transmitted; and receiving, from the wireless device, a constructed Type-1 HARQ codebook.

In some embodiments, the method also includes, prior to transmitting the first TB and the second TB, transmitting, to the wireless device, a configuration with a set of PDSCH-to-HARQ-feedback timing, K1, values and/or a list of PDSCH time domain resource allocations per slot in a serving cell.

In some embodiments, the method also includes, prior to transmitting the first TB and the second TB, transmitting, to the wireless device, an indication to allocate two entries, a first entry and a second entry, in a type-1 HARQ codebook for each of the configured K1 values and each set of overlapping PDSCH time domain resource assignments.

In some embodiments, transmitting the first TB and the second TB comprises transmitting in a slot the first TB, from a first TRP and the second TB from a second TRP, wherein the first and the second TB are scheduled with two DCIs, one for each TB, and with a same time domain resource allocation and a same K1 value.

In some embodiments, transmitting the indication to allocate two entries can be either explicit or implicit. In some embodiments, transmitting the indication to allocate two entries comprises: transmitting one or more of the group consisting of: a higher layer parameter maxNrofCode-WordsScheduledByDCI=2; a higher layer parameter indicating joint HARQ ACK feedback and a configuration of two CORESET groups each a different group identifier value per CORESET for HARQ-ACK reporting; a configuration of one CORESET group each with a same group identifier value per CORESET for HARQ-ACK reporting.

In some embodiments, the first or the second entry is filled with NACK if the first or the second TB is not received, respectively. In some embodiments, the transmitting may further comprise transmitting one or two TBs scheduled by a single DCI. In some embodiments, the first TB corresponds to transport block 1 and the second TB corresponds to transport block 2 as indicated in the DCI. In some embodiments, the base station is a NR gNB.

In some embodiments, the first TB and the second TB are further determined based on one or more of the group consisting of: a DMRS CDM group identifier of one or more DMRS ports indicated in a corresponding DCI scheduling the TB; a TB identifier indicated in a corresponding DCI scheduling the TB; a TCI state identifier indicated in a corresponding DCI scheduling the TB; a TCI state identifier of a CORESET over which a corresponding DCI scheduling the TB is received; and a scrambling identifier of a PDSCH carrying the TB.

In some embodiments, a wireless device for enabling transmission feedback includes one or more processors and memory. The memory stores instructions executable by the one or more processors, whereby the wireless device is operable to perform any of the methods above.

In some embodiments, a base station for enabling transmission feedback includes one or more processors and memory. The memory stores instructions executable by the one or more processors, whereby the base station is operable to perform any of the methods above.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 13A and 13B illustrate methods of operations of a wireless device and a base station, respectively, according to some embodiments of the present disclosure;

FIGS. 23 through 26 are flow charts illustrating methods implemented in a communication system, according to some embodiments of the present disclosure; and FIGS. 27 through 29 depict flowcharts illustrating some methods implemented in a communication system, according to some embodiments of the present disclosure.

DETAILED DESCRIPTION

Figure 1:
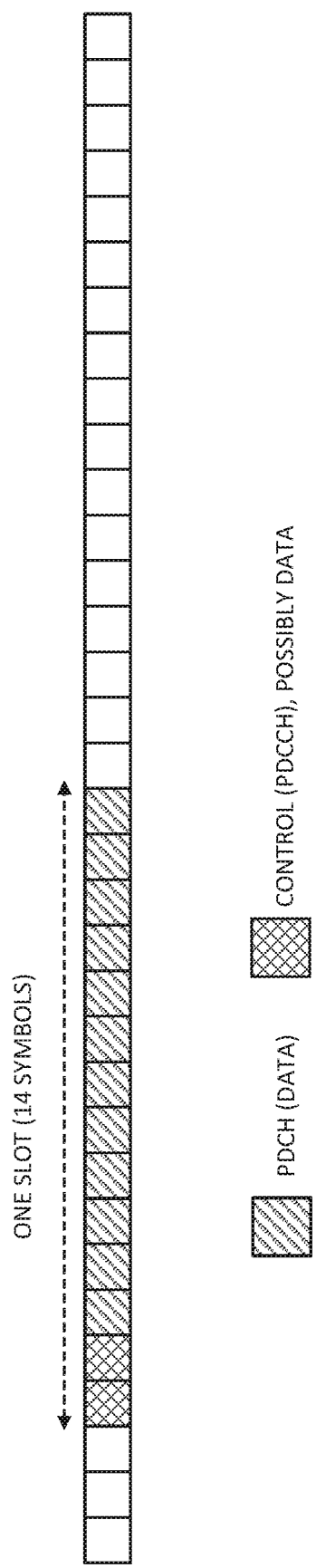
FIG. 1 illustrates a 14-symbol slot, where the first two symbols contain Physical Downlink Control Channels (PDCCHs) and the rest contain physical shared data channels, either Physical Downlink Shared Channels (PDSCHs) or Physical Uplink Shared Channels (PUSCHs)
Figure 2:
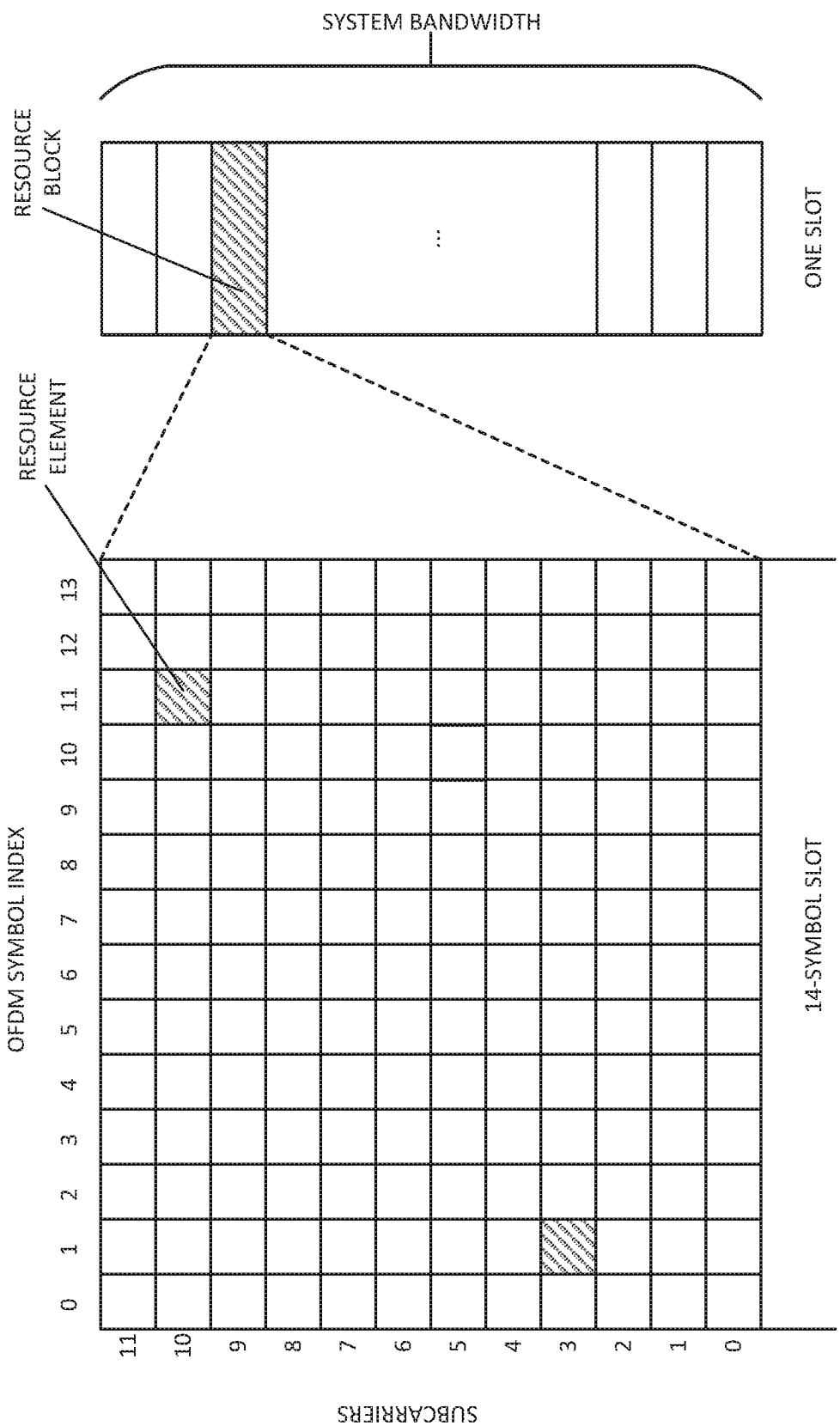
FIG. 2 illustrates a basic New Radio (NR) physical time-frequency resource grid.
Figure 3:
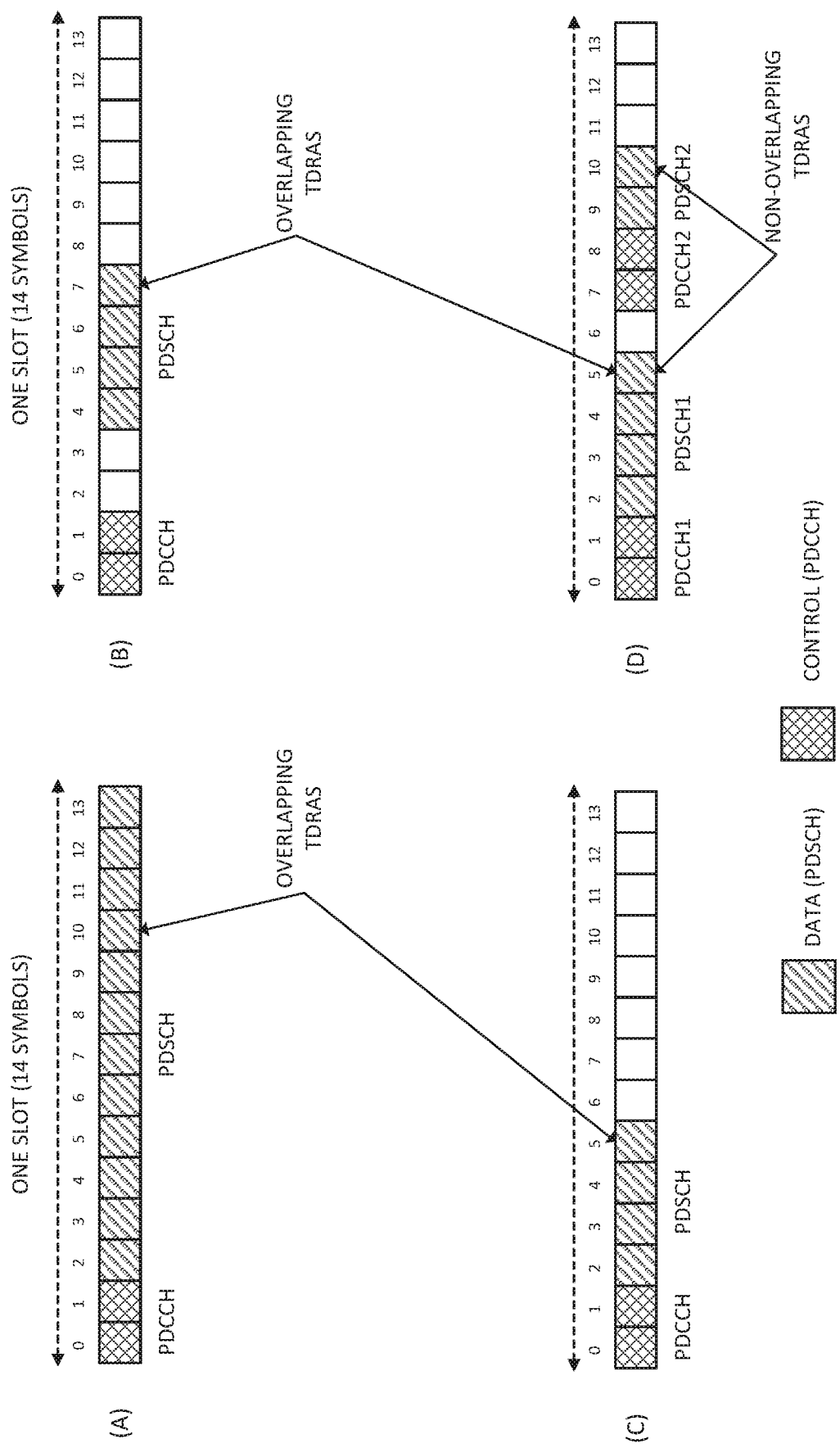
FIG. 3 shows some examples where two type B PDSCHs are scheduled in a slot.
Figure 4:
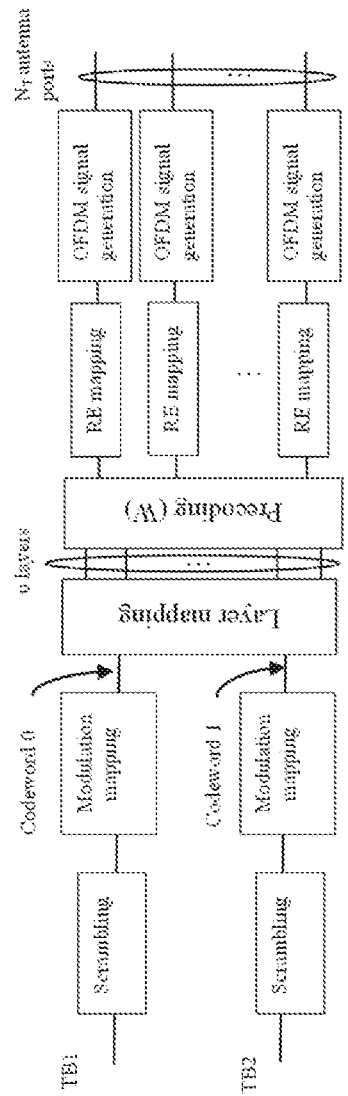
FIG. 4 illustrates NR data transmission over multiple Multiple-Input-Multiple-Output (MIMO) layers.
Figure 5:
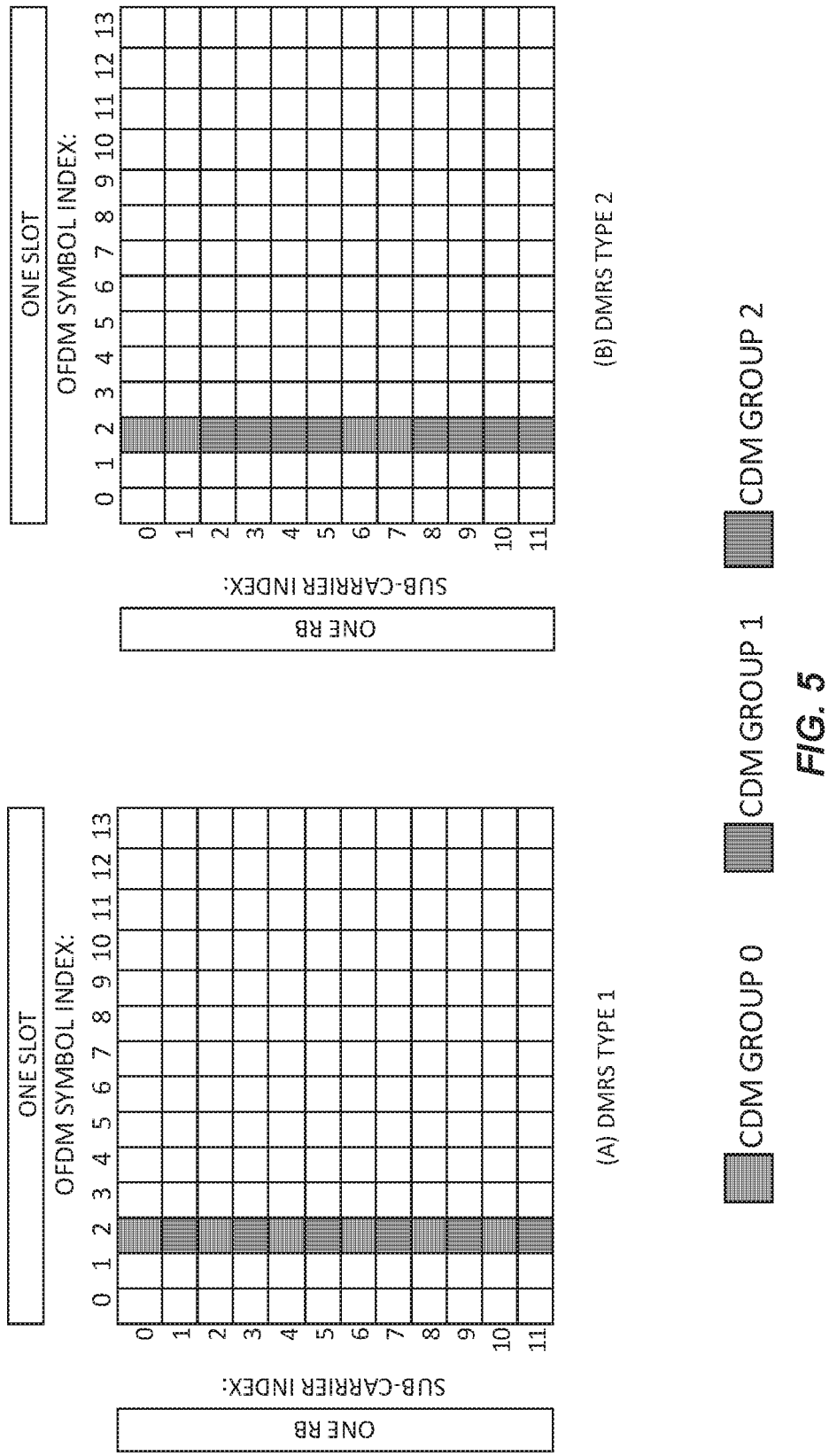
FIG. 5 illustrates mapping of a Demodulation Reference Signal (DMRS) to resource elements which is configurable in both frequency and time domain.
Figure 6:
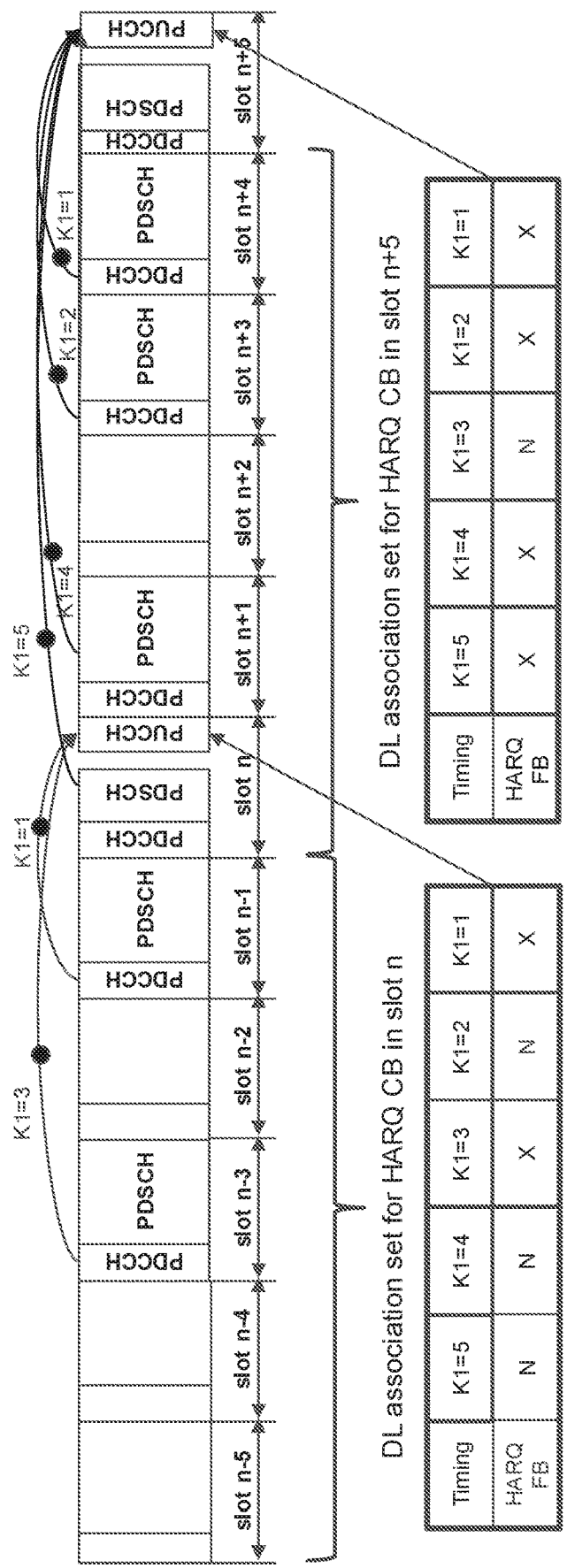
FIG. 6 illustrates a Time Division Duplexing (TDD) pattern with a set of K1 from 1 to 5 and a configured time-domain resource allocation table.
Figure 7:
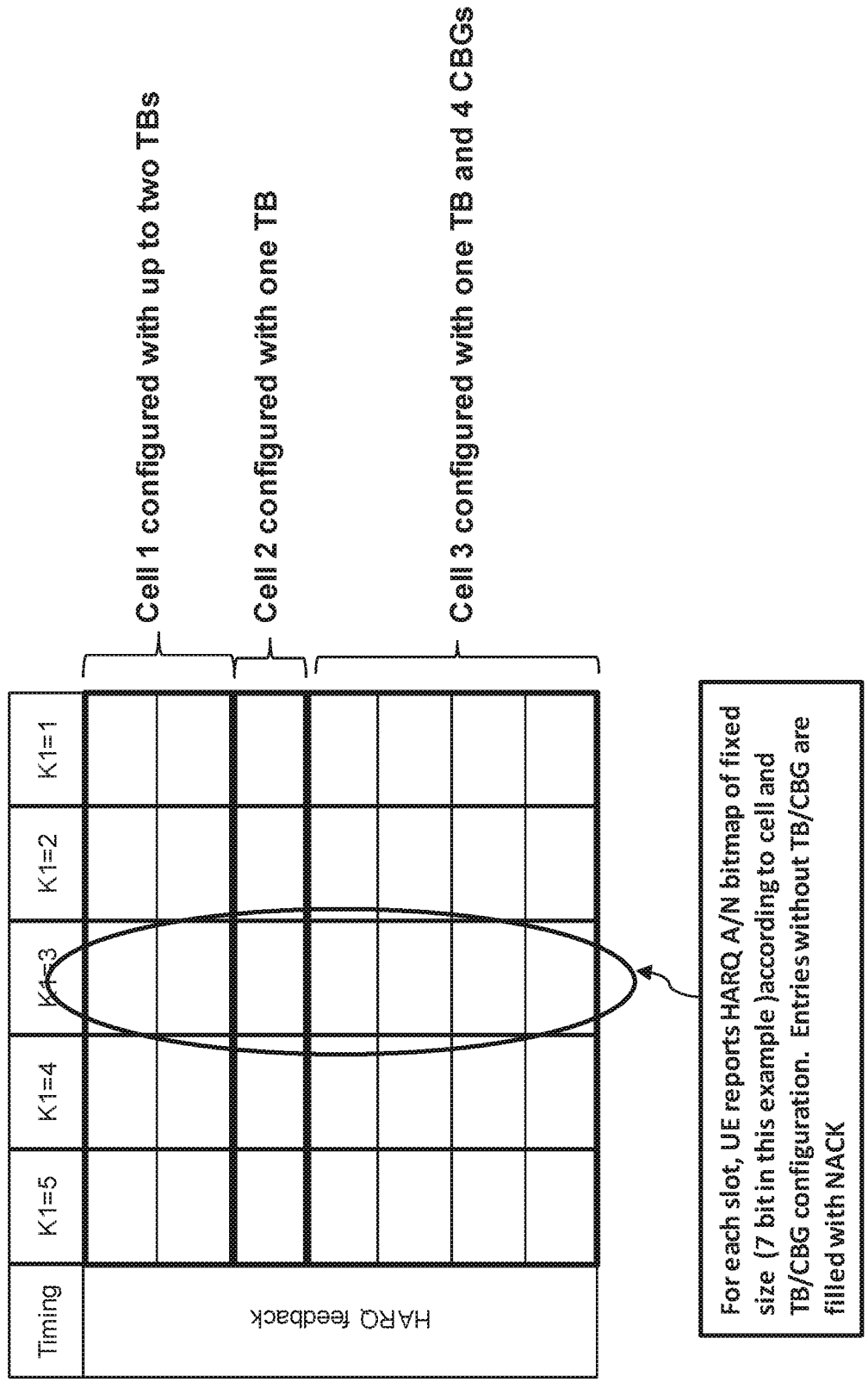
FIG. 7 illustrates a semi-static Hybrid Automatic Repeat Request (HARQ) codebook for a wireless device configured with three cells, i.e., cells 1 to 3.
Figure 8:
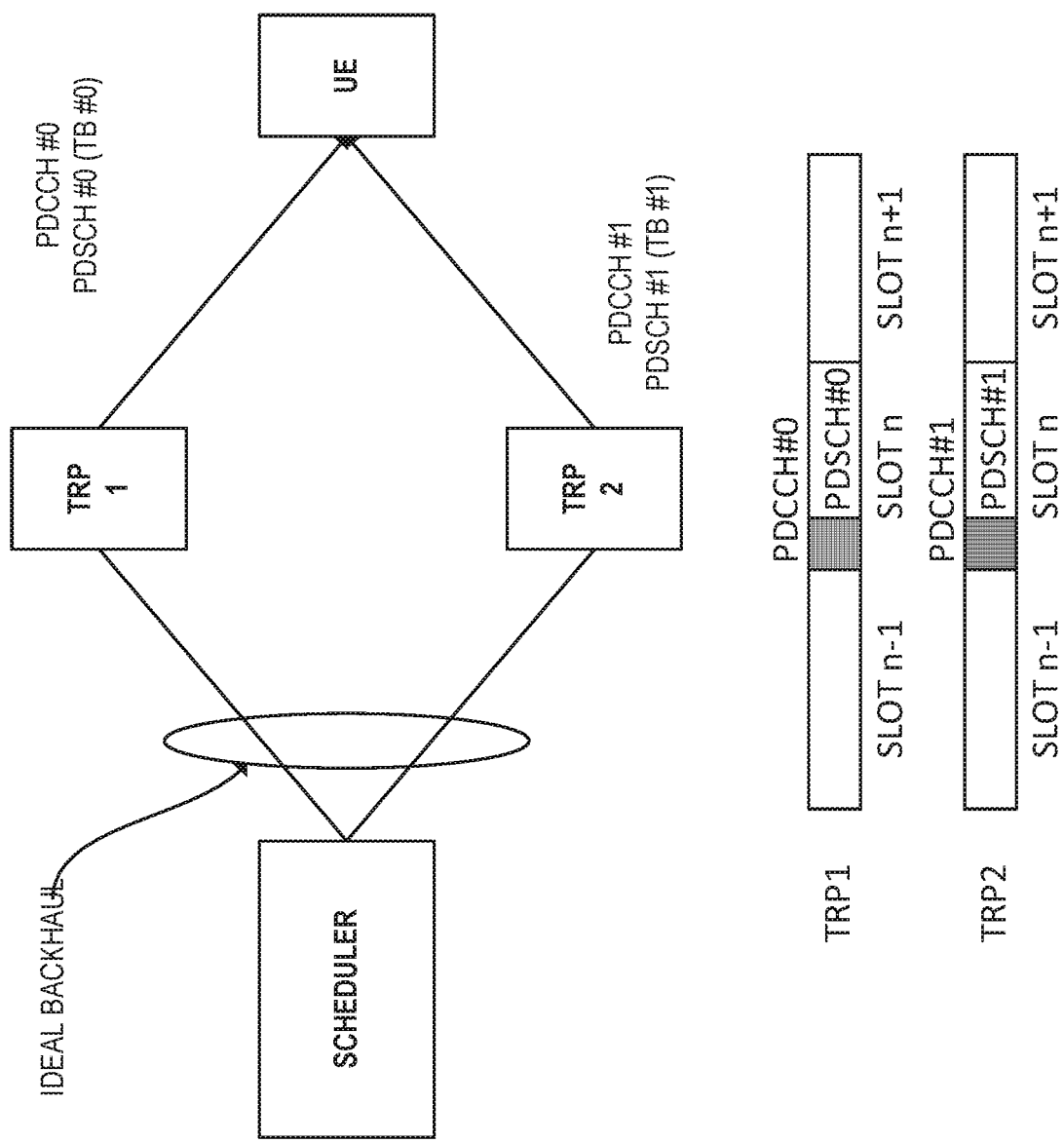
FIG. 8 illustrates data sent to a wireless device over two Transmission Reception Points (TRPs), each TRP carrying one TB mapped to one code word.
Figure 9:
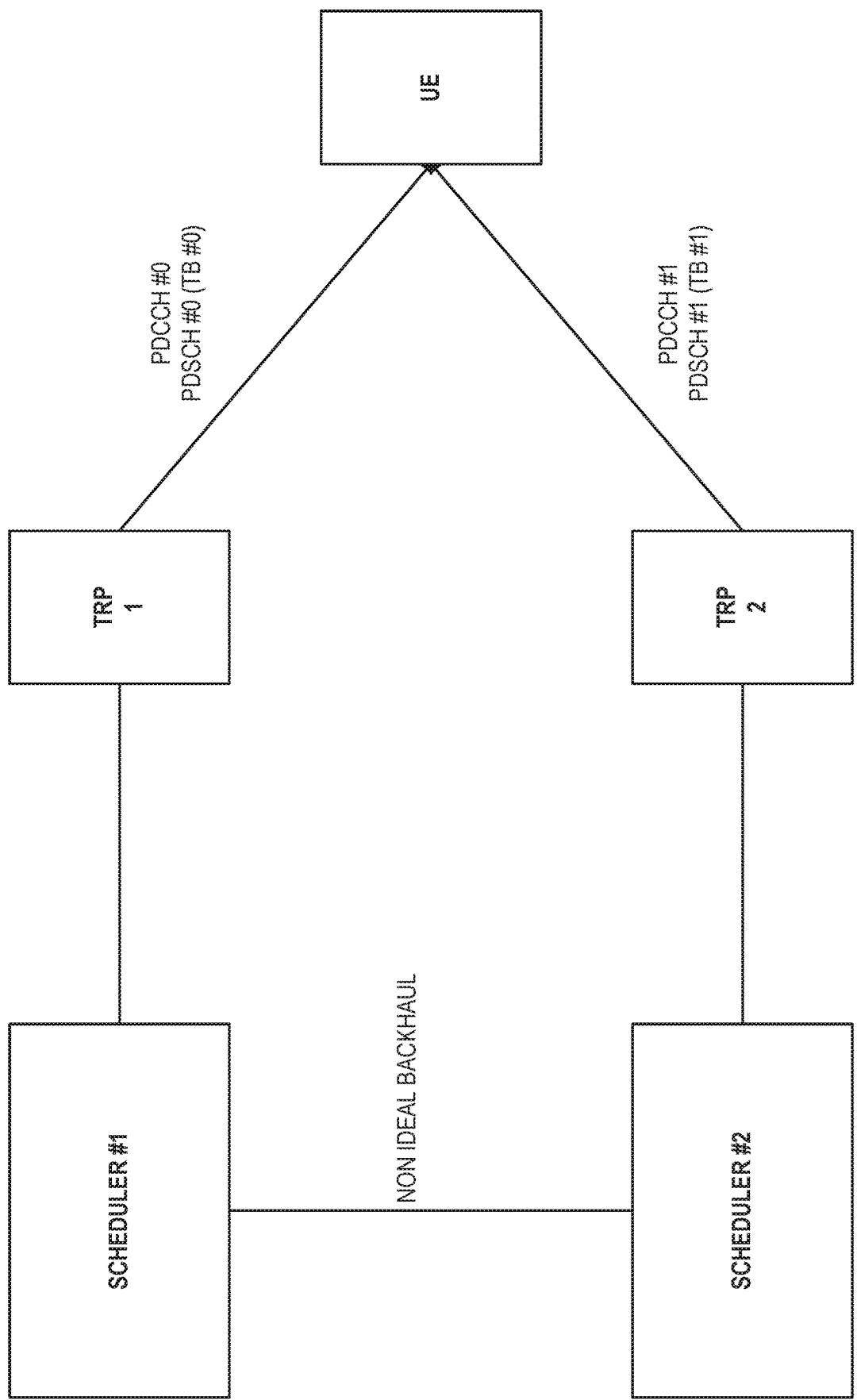
FIG. 9 illustrates independent schedulers are used in each TRP.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network or any node that implements a core network function. Some examples of a core network node include, e.g., a Mobility Management Entity (MME), a Packet Data Network Gateway (PGW), a Service Capability Exposure Function (SCEF), a Home Subscriber Server (HSS), or the like. Some other examples of a core network node include a node implementing a Access and Mobility Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 10:
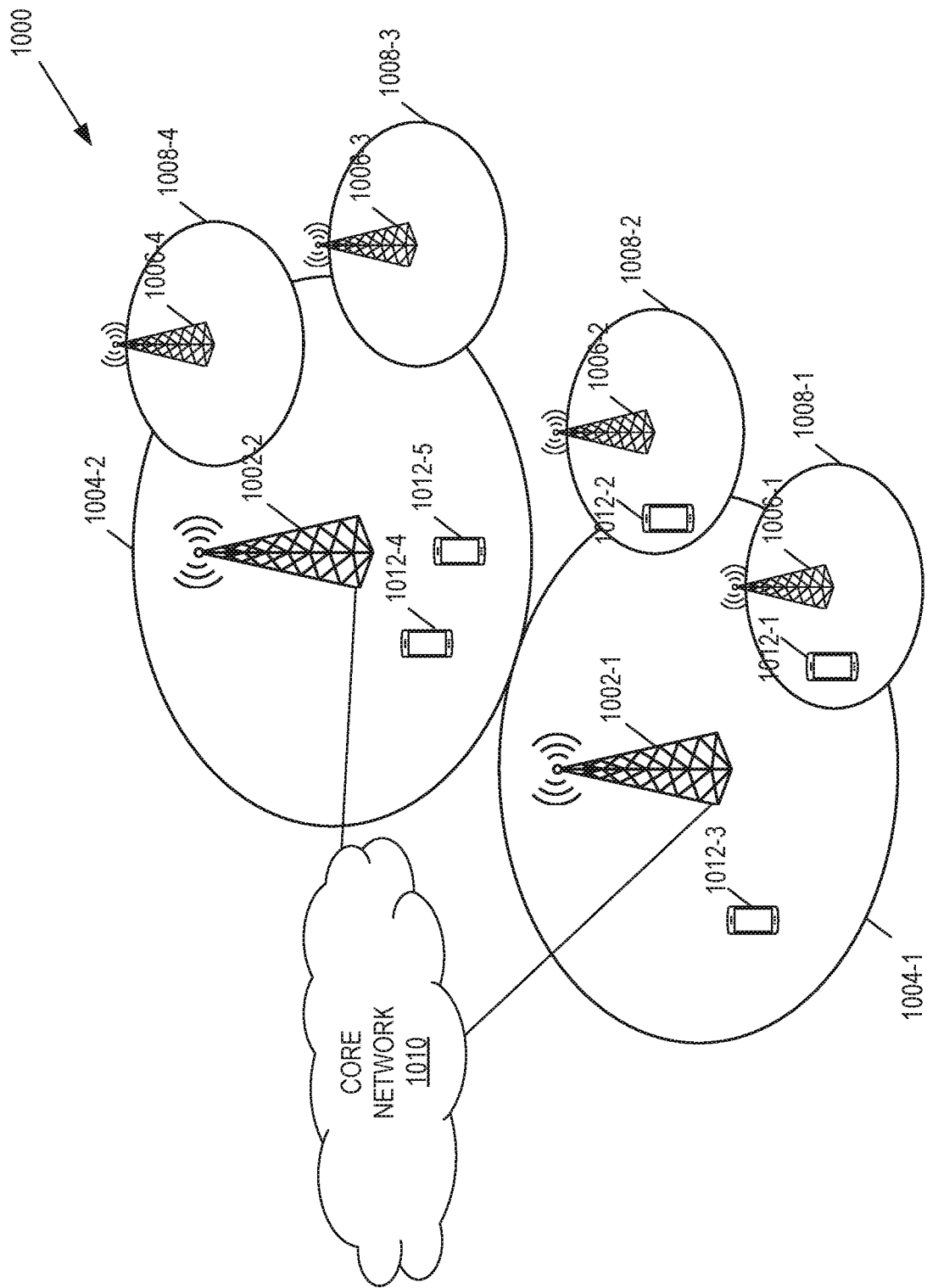
FIG. 10 illustrates one example of a cellular communications system in which embodiments of the present disclosure may be implemented, according to some embodiments of the present disclosure.

FIG. 10 illustrates one example of a cellular communications system 1000 in which embodiments of the present disclosure may be implemented. In the embodiments described herein, the cellular communications system 1000 is a 5G system (5GS) including a NR RAN. In this example, the RAN includes base stations 1002-1 and 1002-2, which in 5G NR are referred to as gNBs, controlling corresponding (macro) cells 1004-1 and 1004-2. The base stations 1002-1 and 1002-2 are generally referred to herein collectively as base stations 1002 and individually as base station 1002. Likewise, the (macro) cells 1004-1 and 1004-2 are generally referred to herein collectively as (macro) cells 1004 and individually as (macro) cell 1004. The RAN may also include a number of low power nodes 1006-1 through 1006-4 controlling corresponding small cells 1008-1 through 1008-4. The low power nodes 1006-1 through 1006-4 can be small base stations (such as pico or femto base stations) or Remote Radio Heads (RRHs), or the like. Notably, while not illustrated, one or more of the small cells 1008-1 through 1008-4 may alternatively be provided by the base stations 1002. The low power nodes 1006-1 through 1006-4 are generally referred to herein collectively as low power nodes 1006 and individually as low power node 1006. Likewise, the small cells 1008-1 through 1008-4 are generally referred to herein collectively as small cells 1008 and individually as small cell 1008. The cellular communications system 1000 also includes a core network 1010, which in the 5GS is referred to as the 5G core (5GC). The base stations 1002 (and optionally the low power nodes 1006) are connected to the core network 1010.

The base stations 1002 and the low power nodes 1006 provide service to wireless devices 1012-1 through 1012-5 in the corresponding cells 1004 and 1008. The wireless devices 1012-1 through 1012-5 are generally referred to herein collectively as wireless devices 1012 and individually as wireless device 1012. The wireless devices 1012 are also sometimes referred to herein as UEs.

Figure 11:
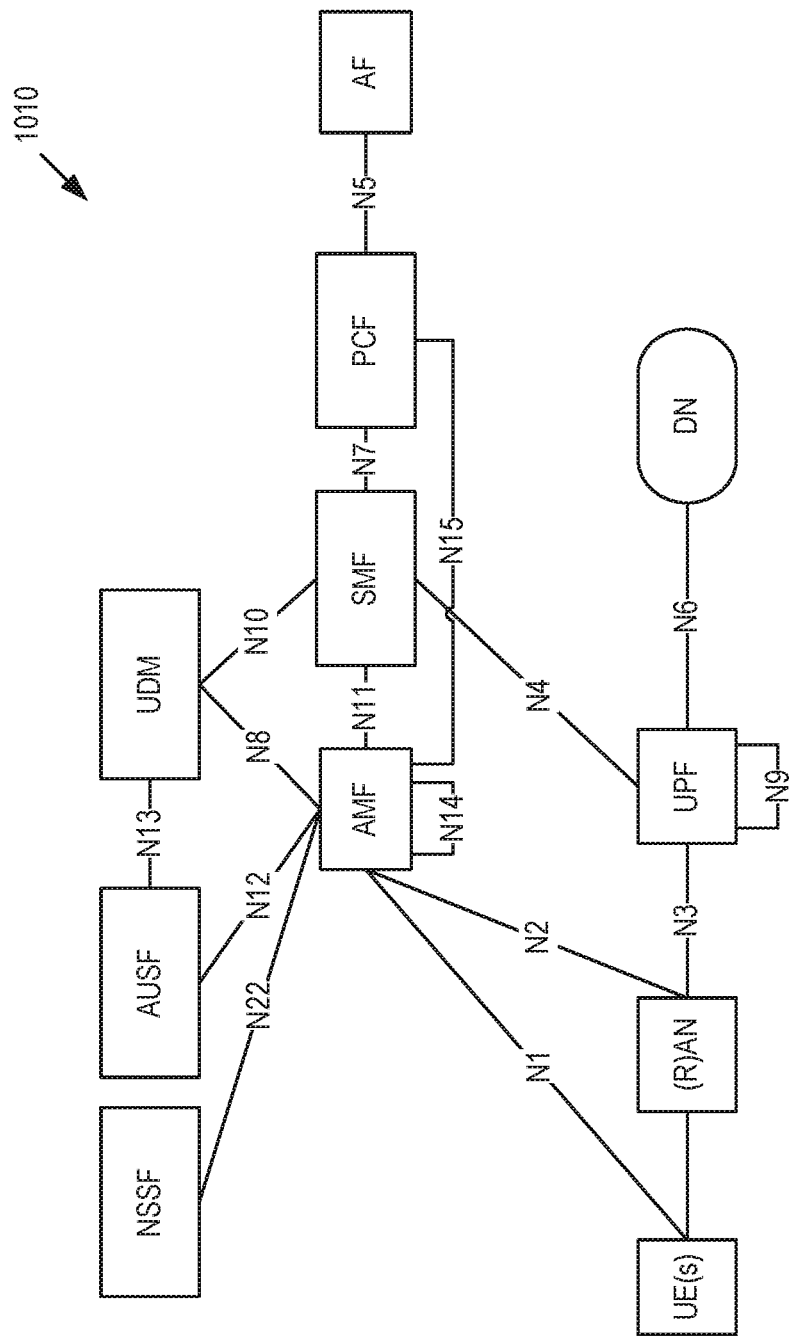
FIG. 11 illustrates a wireless communication system represented as a 5G network architecture composed of core Network Functions (NFs), according to some embodiments of the present disclosure.

FIG. 11 illustrates a wireless communication system represented as a 5G network architecture composed of core Network Functions (NFs), where interaction between any two NFs is represented by a point-to-point reference point/interface. FIG. 11 can be viewed as one particular implementation of the system 1000 of FIG. 10.

Seen from the access side the 5G network architecture shown in FIG. 11 comprises a plurality of User Equipment (UEs) connected to either a Radio Access Network (RAN) or an Access Network (AN) as well as an Access and Mobility Management Function (AMF). Typically, the R(AN) comprises base stations, e.g., such as evolved Node Bs (eNBs) or 5G base stations (gNBs) or similar. Seen from the core network side, the 5G core NFs shown in FIG. 11 include a Network Slice Selection Function (NSSF), an Authentication Server Function (AUSF), a Unified Data Management (UDM), an AMF, a Session Management Function (SMF), a Policy Control Function (PCF), and an Application Function (AF).

Reference point representations of the 5G network architecture are used to develop detailed call flows in the normative standardization. The N1 reference point is defined to carry signaling between the UE and AMF. The reference points for connecting between the AN and AMF and between the AN and UPF are defined as N2 and N3, respectively. There is a reference point, N11, between the AMF and SMF, which implies that the SMF is at least partly controlled by the AMF. N4 is used by the SMF and UPF so that the UPF can be set using the control signal generated by the SMF, and the UPF can report its state to the SMF. N9 is the reference point for the connection between different UPFs, and N14 is the reference point connecting between different AMFs, respectively. N15 and N7 are defined since the PCF applies policy to the AMF and SMF, respectively. N12 is required for the AMF to perform authentication of the UE. N8 and N10 are defined because the subscription data of the UE is required for the AMF and SMF.

The 5G core network aims at separating user plane and control plane. The user plane carries user traffic while the control plane carries signaling in the network. In FIG. 11, the UPF is in the user plane and all other NFs, i.e., the AMF, SMF, PCF, AF, AUSF, and UDM, are in the control plane. Separating the user and control planes guarantees each plane resource to be scaled independently. It also allows UPFs to be deployed separately from control plane functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF and SMF are independent functions in the control plane. Separated AMF and SMF allow independent evolution and scaling. Other control plane functions like the PCF and AUSF can be separated as shown in FIG. 11. Modularized function design enables the 5G core network to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs.

Figure 12:
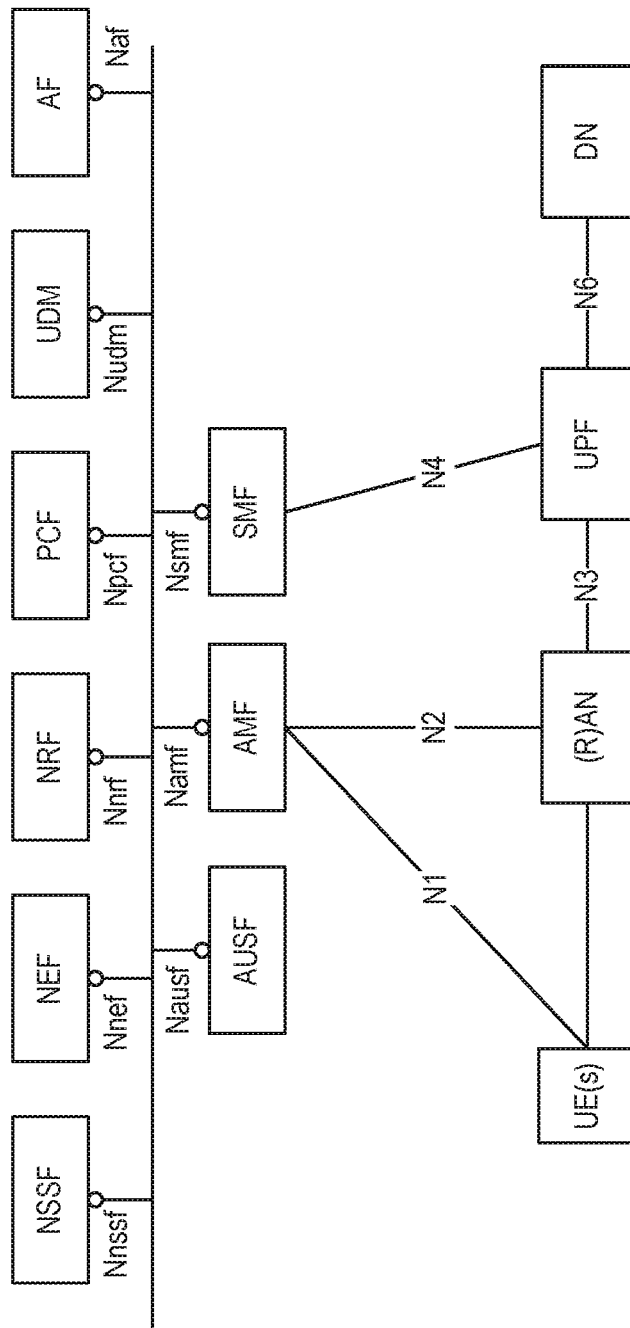
FIG. 12 illustrates a 5G network architecture using service-based interfaces between the NFs in the control plane, instead of the point-to-point reference points/interfaces used in the 5G network architecture of FIG. 11, according to some embodiments of the present disclosure.

FIG. 12 illustrates a 5G network architecture using service-based interfaces between the NFs in the control plane, instead of the point-to-point reference points/interfaces used in the 5G network architecture of FIG. 11. However, the NFs described above with reference to FIG. 11 correspond to the NFs shown in FIG. 12. The service(s) etc. that a NF provides to other authorized NFs can be exposed to the authorized NFs through the service-based interface. In FIG. 12 the service based interfaces are indicated by the letter "N" followed by the name of the NF, e.g., Namf for the service based interface of the AMF and Nsmf for the service based interface of the SMF etc. The Network Exposure Function (NEF) and the Network Function (NF) Repository Function (NRF) in FIG. 12 are not shown in FIG. 11 discussed above. However, it should be clarified that all NFs depicted in FIG. 11 can interact with the NEF and the NRF of FIG. 12 as necessary, though not explicitly indicated in FIG. 11.

Some properties of the NFs shown in FIGS. 11 and 12 may be described in the following manner. The AMF provides UE-based authentication, authorization, mobility management, etc. A UE even using multiple access technologies is basically connected to a single AMF because the AMF is independent of the access technologies. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functionalities per session. The AF provides information on the packet flow to the PCF responsible for policy control in order to support Quality of Service (QoS). Based on the information, the PCF determines policies about mobility and session management to make the AMF and SMF operate properly. The AUSF supports authentication function for UEs or similar and thus stores data for authentication of UEs or similar while the UDM stores subscription data of the UE. The Data Network (DN), not part of the 5G core network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

In RAN1 #97, it was agreed that for separate ACK/NACK feedback for Physical Downlink Shared Channels (PDSCHs) received from different TRPs, the UE should be able to generate separate ACK/NACK codebooks identified by an index, if the index is configured and applied across all CCs. The index to be used to generate separated ACK/NACK codebook is a higher layer signaling index per Control Resource Set (CORESET). In addition, it was agreed that joint HARQ-ACK feedback for PDSCHs received from different TRPs where multiple DCIs are used will also be supported.

There currently exist certain challenges. For joint HARQ-ACK feedback for PDSCHs received from different Transmission Reception Points (TRPs) where multiple DCIs are used, there is a need to determine how to construct the semi-static HARQ codebook. In particular, there is a need to determine how to multiplex A/N bits associated with two PDSCHs.

Systems and methods for joint Hybrid Automatic Repeat Request (HARQ) feedback for PDSCH transmission over multiple TRPs are provided. In some embodiments, a method performed by a wireless device for enabling transmission feedback includes: receiving a first Transport Block (TB) and a second TB; and determining the first TB and the second TB based on a CORESET group identifier of a CORESET over which a corresponding Downlink Control Information (DCI) scheduling the TB is received. In this way, the NR Rel-15 procedure for type 1 HARQ codebook construction might be reused with the same or minimum increase of HARQ feedback overhead with semi-static HARQ-ACK codebook.

FIGS. 13A and 13B illustrate methods of operations of a wireless device and a base station, respectively, according to some embodiments of the present disclosure. As shown in FIG. 13A, a wireless device optionally receives a configuration with a set of PDSCH-to-HARQ-feedback timing, K1, values and/or a list of PDSCH time domain resource allocations per slot in a serving cell (step 1300). The wireless device receives a first TB and a second TB (e.g., in a Component Carrier (CC)) (step 1302). The wireless device determines the first TB and the second TB based on one or more indications. As shown in FIG. 13A, the first TB and second TB are determined based on a CORESET group identifier of a CORESET over which a corresponding DCI scheduling the TB is received (step 1304). The wireless device optionally reports the constructed Type-1 HARQ codebook (step 1306). In this way, the NR Rel-15 procedure for type 1 HARQ codebook construction might be reused with the same or minimum increase of HARQ feedback overhead with semi-static HARQ-ACK codebook.

As shown in FIG. 13B, a base station optionally transmits, to the wireless device, a configuration with a set of PDSCH-to-HARQ-feedback timing, K1, values and/or a list of PDSCH time domain resource allocations per slot in a serving cell (step 1308). The base station transmits, to a wireless device, a first TB and a second TB, where the first TB and the second TB are determined based on a CORESET group identifier of a CORESET over which a corresponding DCI scheduling the TB is transmitted (step 1310). The base station receives, from the wireless device, a constructed Type-1 HARQ codebook (step 1312). In this way, the NR Rel-15 procedure for type 1 HARQ codebook construction might be reused with the same or minimum increase of HARQ feedback overhead with semi-static HARQ-ACK codebook.

Certain aspects of the present disclosure and their embodiments may provide solutions to the aforementioned or other challenges. In some embodiments, a method recognizes that (a) even with multiple PDCCH scheduling from two TRPs, total 2 TBs can be scheduled in a slot and/or (b), fully overlapping time domain resources are used by PDSCHs from the two TRPs. Some embodiments include:

In case of implicit joint A/N feedback signaling, a cell over which joint A/N feedback is to be used is configured with up to 2 TBs and thus two entries per K1 value and a set of overlapping TDRA are reserved for semi-static HARQ-ACK codebook for the cell;

In case of explicit joint A/N feedback signaling, the number of entries per K1 value and a set of overlapping TDRA for Semi-static HARQ-ACK codebook for a cell is determined by the number of CORESET groups configured in the cell.

The mapping of an A/N bit for a received TB to one of the two entries can be according to one of: a DMRS CDM group identifier of one or more DMRS port indicated in a corresponding DCI scheduling the TB; a TB identifier indicated in a corresponding DCI scheduling the TB; a CORESET group identifier of a CORESET over which a corresponding DCI scheduling the TB is received; a TCI state identifier indicated in a corresponding DCI scheduling the TB; a TCI state identifier of a CORESET over which a corresponding DCI scheduling the TB is received; a scrambling identifier of a PDSCH carrying the TB.

A method of Type 1 HARQ-ACK codebook construction for Joint HARQ ACK reporting with multi-DCI based PDSCH transmissions from multiple TRPs in a wireless network consisting of at least a wireless node with two transmission points, TRPs, and at least a user equipment, UE is described herein. The method comprises: configuring, by the wireless node, the UE with a set of PDSCH-to-HARQ-feedback timing, K1, values and a list of PDSCH time domain resource allocations per slot in a serving cell; and indicating, by the wireless node, to the UE to allocate two entries, a first entry and a second entry, in a type-1 HARQ codebook for each of the configured K1 values and each set of overlapping PDSCH time domain resource assignments; and transmitting, by the wireless node, to the UE in a slot a first transport block, TB, from a first TRP and a second TB from a second TRP, wherein the first and the second TB are scheduled with two DCIs, one for each TB, and with a same time domain resource allocation and a same K1 value; and Receiving, by the UE, the first and the second TB; and determining, by the UE, the first or the second TB based on one or more of: a DMRS CDM group identifier of one or more DMRS port indicated in a corresponding DCI scheduling the TB; a TB identifier indicated in a corresponding DCI scheduling the TB; A CORESET group identifier of a CORESET over which a corresponding DCI scheduling the TB is received; a TCI state identifier indicated in a corresponding DCI scheduling the TB; a TCI state identifier of a CORESET over which a corresponding DCI scheduling the TB is received; a scrambling identifier of a PDSCH carrying the TB.

Mapping, by the UE, a HARQ-ACK bit for the first TB to the first entry and a HARQ-ACK bit for the second TB to the second entry in the Type-1 HARQ-ACK codebook associated with the same K1 value and the same time domain resource allocation; and Reporting, by the UE, the constructed Type-1 HARQ codebook to the wireless node. The method of 1, wherein the indicating can be either explicit or implicit by one of: configuring a higher layer parameter maxNrofCodeWordsScheduledByDCI=2; configuring two CORESET groups each a different group identifier value per CORESET for HARQ-ACK reporting.

The method of 1, wherein the first or the second entry is filled with NACK if the first or the second TB is not received, respectively. The method of 1, wherein the transmitting may further comprise transmitting one or two TBs scheduled by a single DCI. The methods of 1 and 4, wherein the first TB corresponds to transport block 1 and the second TB corresponds to transport block 2 as indicated in the DCI.

There are, proposed herein, various embodiments which address one or more of the issues disclosed herein. In some embodiments, a method performed by a wireless device for providing transmission feedback includes: receiving a first Transport Block (TB) and a second TB; and determining the first TB and the second TB based on one or more of the group consisting of: a Demodulation Reference Signal (DMRS) Code Division Multiplexing (CDM) group identifier of one or more DMRS ports indicated in a corresponding Downlink Control Information (DCI) scheduling the TB; a TB identifier indicated in a corresponding DCI scheduling the TB; a Control Resource Set (CORESET) group identifier of a CORESET over which a corresponding DCI scheduling the TB is received; a TCI state identifier indicated in a corresponding DCI scheduling the TB; a TCI state identifier of a CORESET over which a corresponding DCI scheduling the TB is received; and a scrambling identifier of a PDSCH carrying the TB.

Certain embodiments may provide one or more of the following technical advantage(s). The NR Rel-15 procedure for type 1 HARQ codebook construction can be reused with the same or minimum increase of HARQ feedback overhead with semi-static HARQ-ACK codebook.

In some embodiments, the method also includes, prior to receiving the first TB and the second TB: receiving a configuration with a set of PDSCH-to-HARQ-feedback timing, K1, values and/or a list of PDSCH time domain resource allocations per slot in a serving cell.

In some embodiments, the method also includes, prior to receiving the first TB and the second TB: receiving an indication to allocate two entries, a first entry and a second entry, in a type-1 HARQ codebook for each of the configured K1 values and each set of overlapping PDSCH time domain resource assignments.

In some embodiments, the method also includes mapping a HARQ-ACK bit for the first TB to the first entry and a HARQ-ACK bit for the second TB to the second entry in the Type-1 HARQ-ACK codebook associated with the same K1 value and the same time domain resource allocation. In some embodiments, the method also includes reporting the constructed Type-1 HARQ codebook.

In some embodiments, receiving the first TB and the second TB comprises receiving in a slot the first TB from a first TRP and the second TB from a second TRP, wherein the first and the second TB are scheduled with two DCIs, one for each TB, and with a same time domain resource allocation and a same K1 value.

In some embodiments, receiving the indication to allocate two entries can be either explicit or implicit. In some embodiments, receiving the indication to allocate two entries comprises: receiving a higher layer parameter maxNrofCodeWordsScheduledByDCI=2; and/or configuring two CORESET groups each a different group identifier value per CORESET for HARQ-ACK reporting.

In some embodiments, the first or the second entry is filled with NACK if the first or the second TB is not received, respectively. In some embodiments, the transmitting may further comprise transmitting one or two TBs scheduled by a single DCI. In some embodiments, the first TB corresponds to transport block 1 and the second TB corresponds to transport block 2 as indicated in the DCI. In some embodiments, the wireless device is a New Radio (NR) User Equipment (UE).

In some embodiments, a method performed by a base station for receiving transmission feedback includes: transmitting, to a wireless device, a first TB and a second TB; and receiving, from the wireless device, a constructed Type-1 HARQ codebook.

In some embodiments, the method also includes, prior to transmitting the first TB and the second TB: transmitting, to the wireless device, a configuration with a set of PDSCH-to-HARQ-feedback timing, K1, values and/or a list of PDSCH time domain resource allocations per slot in a serving cell.

In some embodiments, the method also includes, prior to transmitting the first TB and the second TB: transmitting, to the wireless device, an indication to allocate two entries, a first entry and a second entry, in a type-1 HARQ codebook for each of the configured K1 values and each set of overlapping PDSCH time domain resource assignments.

In some embodiments, transmitting the first TB and the second TB comprises transmitting in a slot the first TB, from a first TRP and the second TB from a second TRP, wherein the first and the second TB are scheduled with two DCIs, one for each TB, and with a same time domain resource allocation and a same K1 value.

In some embodiments, transmitting the indication to allocate two entries can be either explicit or implicit. In some embodiments, transmitting the indication to allocate two entries comprises: transmitting a higher layer parameter maxNrofCodeWordsScheduledByDCI=2; and/or configuring two CORESET groups each a different group identifier value per CORESET for HARQ-ACK reporting.

In some embodiments, the first or the second entry is filled with NACK if the first or the second TB is not received, respectively. In some embodiments, the transmitting may further comprise transmitting one or two TBs scheduled by a single DCI. In some embodiments, the first TB corresponds to transport block 1 and the second TB corresponds to transport block 2 as indicated in the DCI. In some embodiments, the base station is a NR gNB.

Note that for multiple PDSCH transmission with multiple PDCCH, the total number of TBs that can be scheduled in a time-domain resource is two. In other words, only two PDSCHs, each with one TB, can be scheduled in a slot over a same time domain resource. If the UE is configured (either explicitly or implicitly) to use type 1 HARQ-ACK codebook (i.e., semi-static HARQ codebook) for joint HARQ A/N on a CC, the UE can be configured (either explicitly or implicitly) with up to two TBs for the CC for type 1 HARQ-ACK codebook construction. If the UE is configured with a higher layer parameter maxNrofCodeWordsScheduledByDCI=2, there is no additional signaling needed as two TBs would be assumed for type 1 codebook construction according to the Rel-15 procedure. If the UE is configured with maxNrofCodeWordsScheduledByDCI=1, then additional indication/signaling is needed to let the UE know that two TBs are needed for constructing type 1 HARQ codebook for the CC.

Figure 13C:
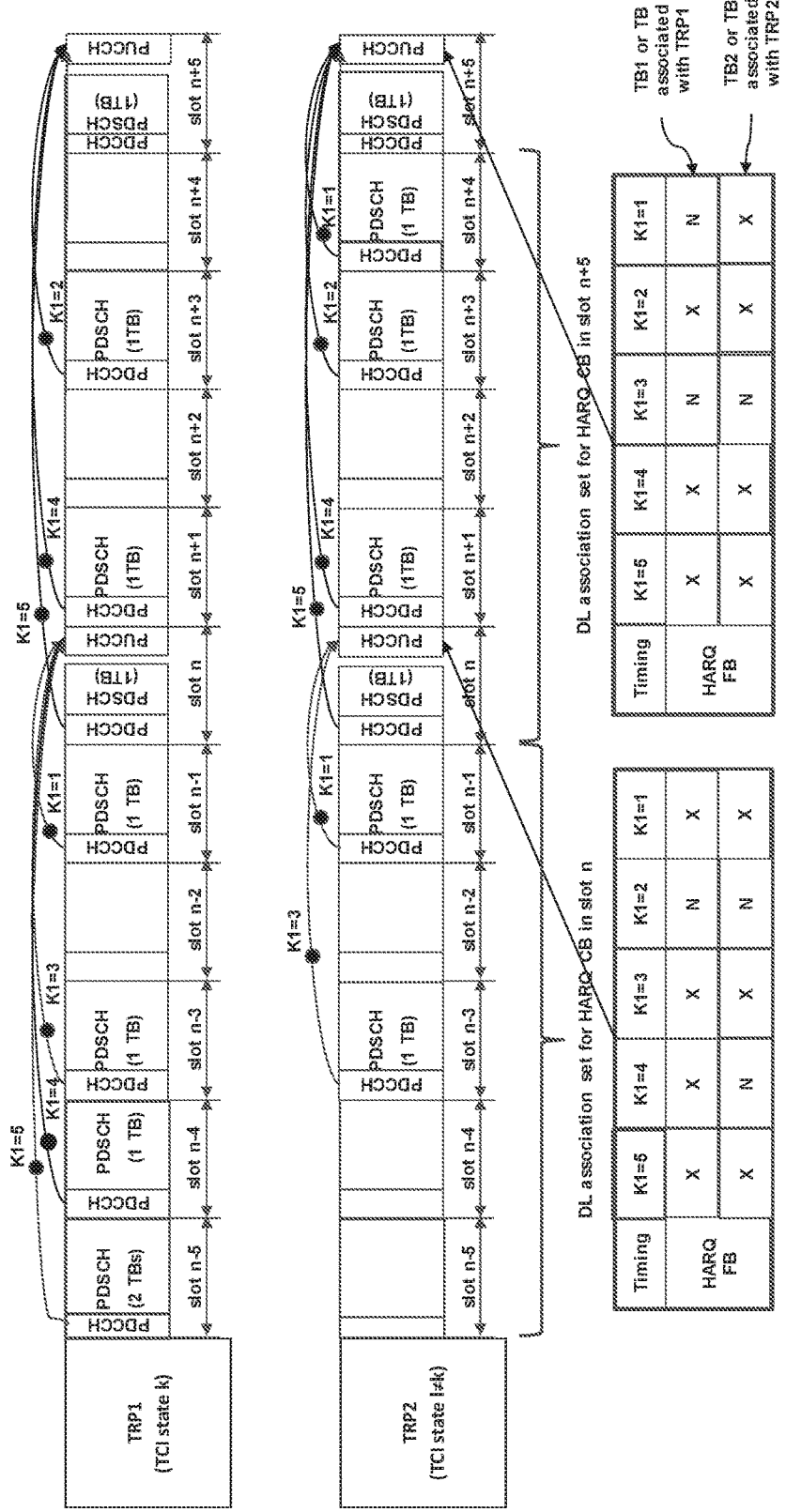
FIG. 13C illustrates a wireless device configured with a K1 range from 1 to 5 which receives either one PDSCH in a slot from one TRP or two PDSCHs in a slot from two TRPs, according to some embodiments of the present disclosure.

An example is shown in FIG. 13C, where a UE is configured with a K1 range from 1 to 5 and receives either one PDSCH in a slot from one TRP or two PDSCHs in a slot from two TRPs. A semi-static HARQ-ACK codebook then consists of five entries each associated with a K1 value and two rows (note the example in the figure is for illustration only and the real codebook is a long bit vector arranged in certain predefined order), each associated with a TB. In case one PDSCH with two TBs is received in a slot (i.e., maxNrofCodeWordsScheduledByDCI=2 is configured), the first row is associated with TB1 and the second row with TB2, regardless of which TRP the PDSCH is received from. For example, a PDSCH with two TBs is received at slot n−5, the corresponding entry in the first row with K1=5 is associated with TB1 and the corresponding entry in the second row with K1=5 is associated with TB 2. TB1 and TB2 are indicated in the corresponding DCI.

If a PDSCH with one TB is received, whether the TB is associated with the entry in the first row or the second row can be determined by the TRP from which the PDSCH is received, e.g., the first row is associated with TRP1 and the second row with TRP2. For example, a PDSCH with one TB is received at slot n−4 from TRP1, the TB is associated with the corresponding entry (K1=4) in the first row and the entry in the second row is filled with NACK (as there is no PDSCH received from TRP2). In another example, a PDSCH with one TB is received at slot n+4 from TRP2, then the TB is associated with the corresponding entry (K1=1) in the second row and the entry in the first row is filled with NACK (as there is no PDSCH received from TRP1).

If two PDSCHs are received in a slot, e.g., at slots n−3, n−1, n, n+1, n+3, and n+5, only one TB can be carried by each PDSCH according to the agreement reached in 3GPP. In this case, the corresponding entry in the first row is associated with a first TB (TB 1) received from TRP1 and the corresponding entry in the second row is associated with a second TB (TB 2) received from TRP2. However, TRP1 and TRP2 are neither directly signaled to the UE nor specified in 3GPP specifications. Hence, the first and second TB, i.e., TB1 and TB2 need to be determined by one or more other parameters.

In case no PDSCH is received in a slot, the corresponding entries in both rows are filled with NACK. For example, no PDSCH is received in slot n−2, the corresponding entries at K=2 are filled with NACK.

With implicit signaling, joint HARQ A/N feedback is used if the CORESETs where PDCCHs for multi-TRP transmission are received in a CC have a same higher layer configured index per CORESET (i.e., a single CORESET group is configured) or are not configured with a higher layer index per CORESET for multiple PDSCH transmission with multiple PDCCH. Note that if different higher layer configured indices are configured for the CORESETs (i.e., two different CORESET groups are configured), then separate HARQ A/N feedback is used for multiple PDSCH transmission scheduled by multiple PDCCH. In this case, the higher layer configured index per CORESET (which can be used to configure a single CORESET group vs two CORESET groups) is used to differentiate between using joint HARQ A/N feedback vs separated HARQ A/N feedback.

In one embodiment, the UE is configured with maxNrofCodeWordsScheduledByDCI=2, even though only one TB can be carried by a PDSCH or the UE is only capable of receiving up to four DL MIMO layers. In this case, two TB fields are used in DCI format 1_1 but only one TB is enabled. That is, the first or the second TB is indicated in the corresponding DCIs. For example, TB1 is mapped to the first row and TB2 is mapped to the second row in FIG. 13C. A TB is disabled if $I_{MCS}=26$ and $rv_{id}=1$ for the corresponding transport block indicated in a DCI.

If the UE is capable of supporting more than 4 DL MIMO layers and a DCI is received with two TBs enabled, then the legacy TB to codeword mapping is used, i.e., TB1 is mapped to the first row and TB2 to the second row.

The drawback of the embodiment is that because two TB fields in DCI format 1-1 are used, there is an increase of DCI overhead if one TB is always scheduled per PDSCH.

In another embodiment, joint HARQ ACK feedback with two TBs per CC may be indicated by configuring a single CORESET group, i.e., a single RRC configured index value for all CORESETS. In this case, if maxNrofCodeWordsScheduledByDCI=1 is configured, then only one TB field is needed in DCI format 1_1 and thus DCI overhead can be saved. When a PDSCH is received, whether the corresponding TB is the first or the second TB needs to be determined.

When the two PDSCHs are transmitted from two TRPs in fully overlapping time resources, the TCI states indicated in the corresponding DCIs should be different; the TCI state can be used to indicate PDSCH 1 or PDSCH 2 (and thus TB1 and TB2, respectively).

Figure 14:
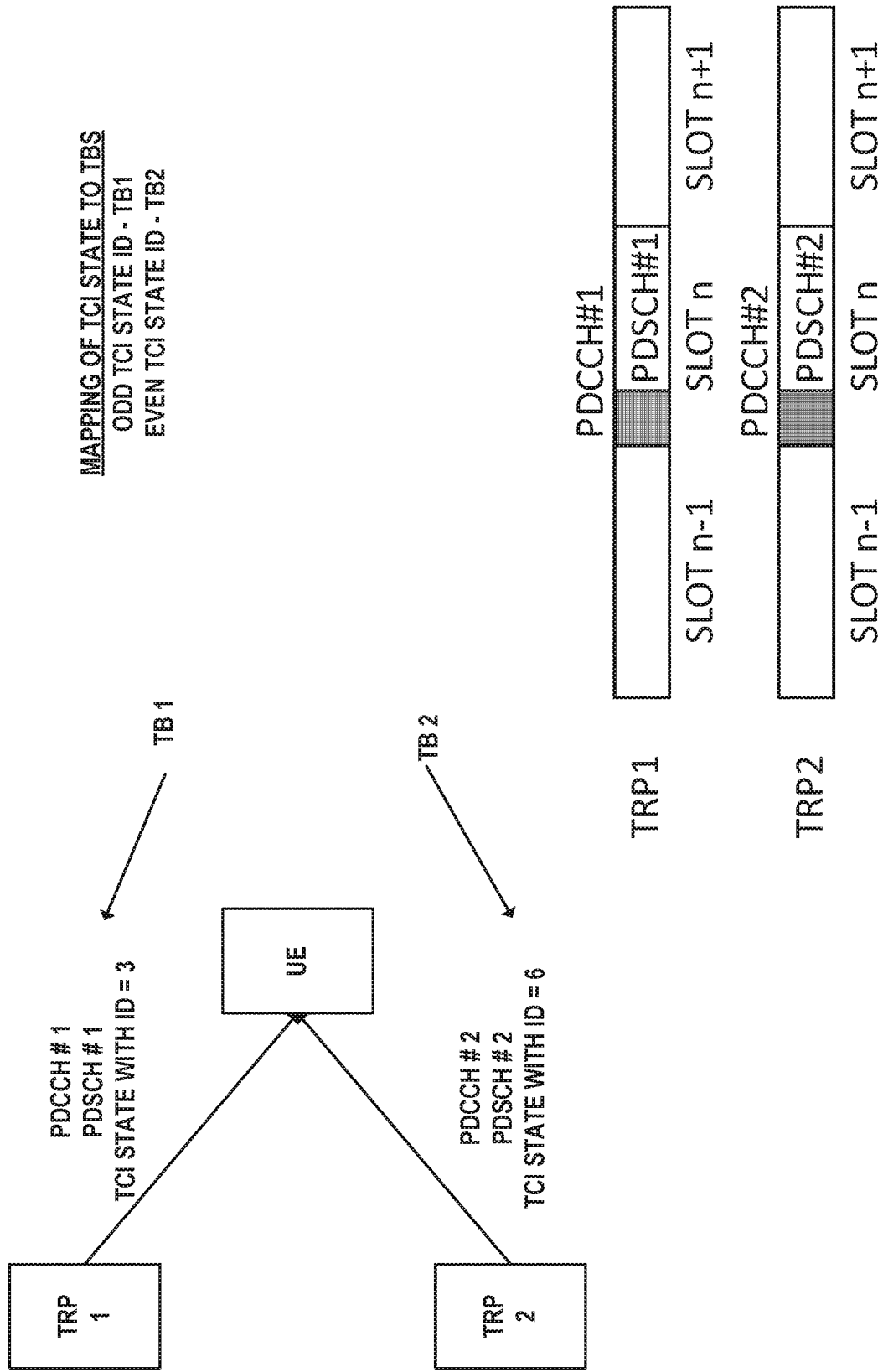
FIG. 14 shows an example where PDCCH #1 and PDCCH #2 are transmitted from TRPs 1 and 2, respectively, according to some embodiments of the present disclosure.

In NR, the TCI field in DCI can indicate a TCI state (with a corresponding TCI state ID) that conveys QCL information for the reception of PDSCH DMRS. FIG. 14 shows an example where PDCCH #1 and PDCCH #2 are transmitted from TRPs 1 and 2, respectively. As shown in FIG. 14, the DCI corresponding to PDCCH #1 scheduling PDSCH #1 can indicate one TCI State (e.g., with TCI State ID 3) while the DCI corresponding to PDCCH #2 scheduling PDSCH #2 can indicate another TCI State (e.g., with TCI State ID 6). In one variant of this embodiment, a rule is defined such that if the TCI State ID indicated in the DCI of a PDCCH is odd, then the TB corresponding to the PDSCH is the first TB. If the TCI State ID indicated in the DCI of a PDCCH is even, then the TB corresponding to the PDSCH is the second TB. Stated more generally, if the TCI State ID indicated in the DCI of a PDCCH is i, then the TB corresponding to the PDSCH is the $[mod(i,m)]^{th}$ TB where m=2.

Figure 15:
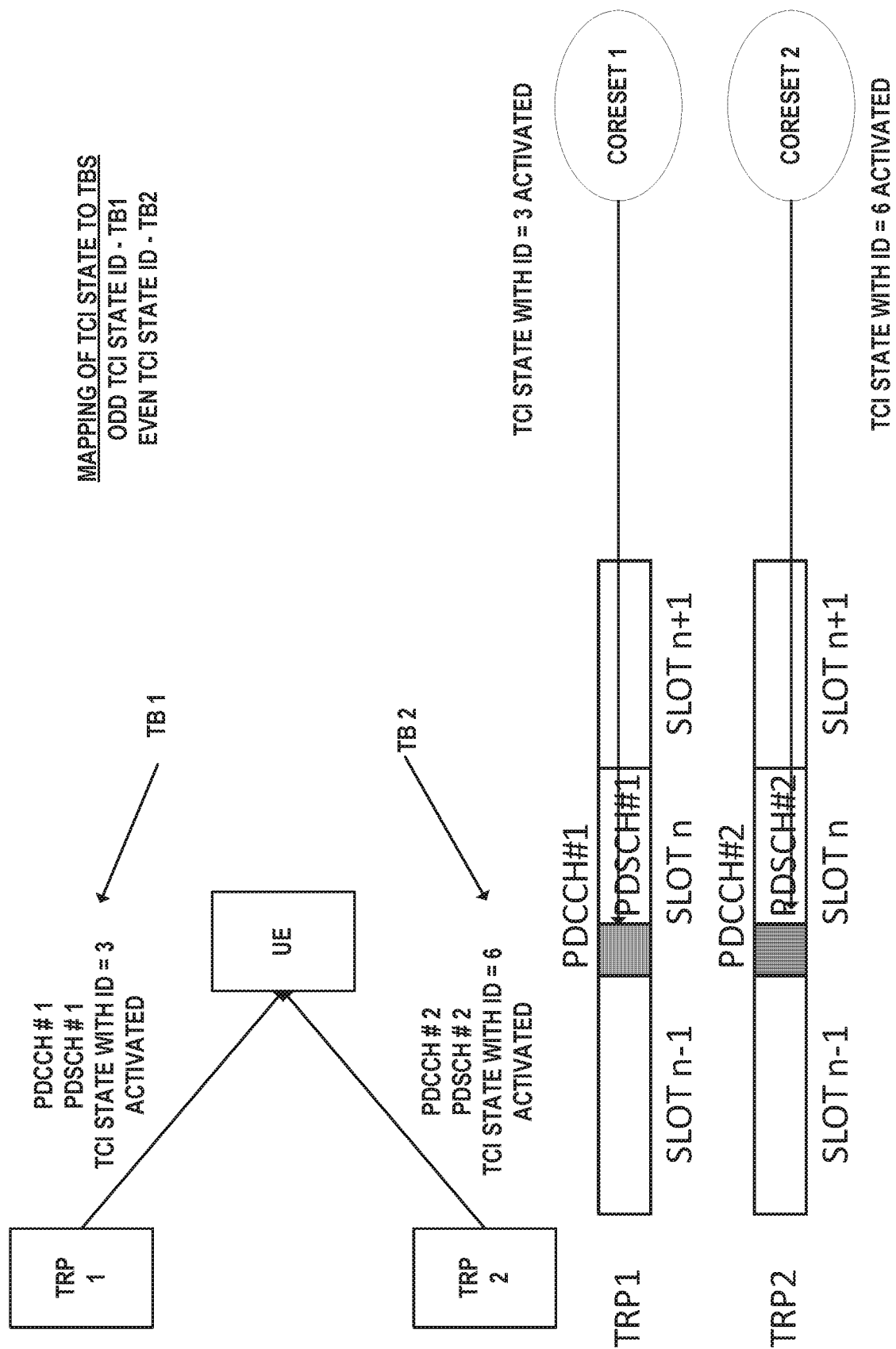
FIG. 15 shows an example where PDCCH #1 and PDCCH #2 are transmitted from TRPs 1 and 2, respectively, according to some embodiments of the present disclosure.

In another embodiment, the TCI state activated for PDCCH that convey QCL information for the reception of PDCCH DMRS is used to indicate PDSCH 1 or PDSCH 2 (and thus TB 1 and TB 2, respectively). In NR, a list of TCI States can be configured in a CORESET and one of the TCI states is activated which provides the QCL relation for PDCCH DMRS for PDCCHs received in the CORESET. FIG. 15 shows an example where PDCCH #1 and PDCCH #2 are transmitted from TRPs 1 and 2, respectively. As shown in FIG. 15, PDCCH #1 is received in CORESET 1 which has TCI State with ID=3 activated, while PDCCH #2 is received in CORESET 2 which has TCI State with ID=6 activated. In this embodiment, a rule is defined such that if the activated TCI State ID corresponding to the CORESET carrying the PDCCH is odd then the TB corresponding to the PDSCH scheduled by that PDCCH is the first TB. If the activated TCI State ID corresponding to the CORESET carrying the PDCCH is even then the TB corresponding to the PDSCH scheduled by that PDCCH is the second TB. Stated more generally, if the activated TCI State ID corresponding to the CORESET carrying the PDCCH is i, then the TB corresponding to the PDSCH is the $[mod(i,m)]^{th}$ TB where m=2.

Figure 16:
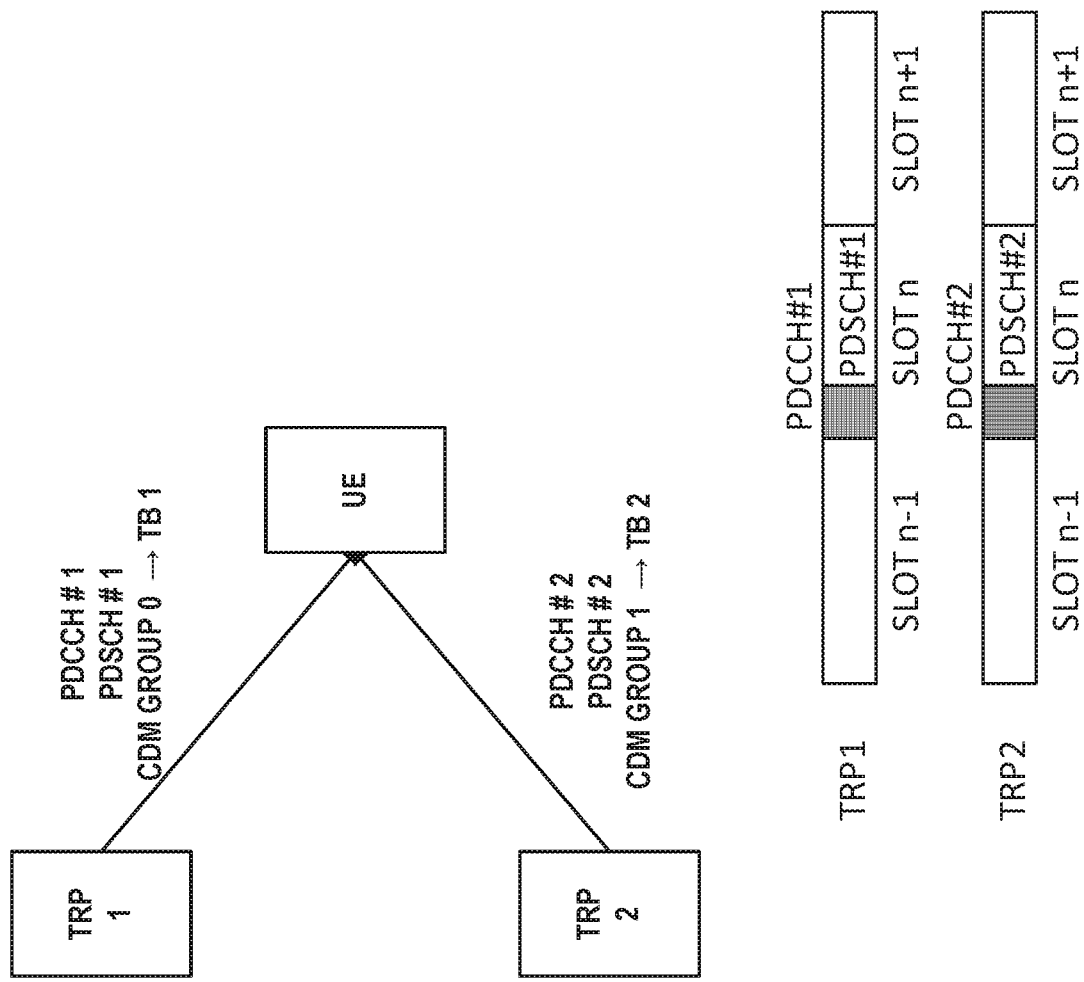
FIG. 16 illustrates a CDM group 0 signaled for PDSCH #1 and CDM group 1 is signaled for PDSCH #2, according to some embodiments of the present disclosure.

In addition, different DMRS CDM groups can be used to indicate PDSCH 1 or PDSCH 2 (and thus TB1 and TB2, respectively). In one embodiment, the first and the second TB are determined by the DMRS CDM groups, i.e., the first TB (TB1) is associated with a PDSCH having CDM group λ=0 and the second TB (TB2) is associated with a PDSCH having CDM group λ=1 or λ=2. An example is shown in FIG. 16, where CDM group 0 is signaled for PDSCH #1 and CDM group 1 is signaled for PDSCH #2. Based on the embodiment, the first TB (TB 1) is associated with PDSCH #1 while the second TB (TB 2) is associated with PDSCH #2. The CGM group number or index can be identified from the DMRS port(s) signaled in the corresponding DCI.

For DMRS type 2, there are 3 DMRS CDM groups. Hence, a rule can be defined such that one of the TBs is associated with a PDSCH having its DMRS in one CDM group while the other TB is associated with a PDSCH having its DMRS in one or both of the remaining two CDM groups. Consider the following example:

If the DMRS for PDSCH #1 is in CDM group 0, then TB 1 is associated with PDSCH #1. If the DMRS for PDSCH #2 is in CDM group 1, 2, or both, then TB 2 is associated with PDSCH #2.

In 3GPP RAN1 #97, it was agreed to introduce multiple PDSCH scrambling Identities for the case of multiple PDCCH scheduling multiple PDSCHs. Each PDSCH scrambling identity is used to generate the PDSCH scrambling sequence for one of the PDSCHs. In one embodiment, the first and the second TB are determined by the PDSCH scrambling Identities. For example, if the PDSCH scrambling identity is odd, then the PDSCH is associated with the first TB. If the PDSCH scrambling identity is even, then the PDSCH is associated with the second TB.

In addition to CDM groups or TCI states of PDSCH other parameters or characteristics associated with PDSCH, PDCCH, or DCI conveyed in the DCI can be used to associate a PDSCH with a TB (and thus the HARQ entry in the codebook). For example, the TCI state of the scheduling DCI can be used. Alternatively, an explicit bit in the DCI indicating the TB can be envisioned. A numbering of the PDCCH candidate within a search space (e.g., based on first CCE used by PDCCH) can be used to associate the scheduled PDSCH with a TB.

If only one PDCCH is received scheduling a PDSCH with two TBs, the Rel-15 behavior of mapping the TB feedback to positions in the HARQ codebook is used.

So far it has been assumed at most one PDSCH from a TRP per slot is received by the UE. This can be relaxed in a similar way as in Rel-15: Each of the TRP is associated with a (same or different) PDSCH time-domain resource allocation table. As in Rel-15, this table is pruned to remove overlapping entries and PDSCH allocations overlapping with UL symbol(s). For each entry after pruning, one HARQ entry is reserved. To extend this principle to multi-TRP, the combined PDSCH time-domain resource allocation table of both TRPs is created as the union of the individual time-domain resource allocation tables. For each element of the union, two entries (one for each TB) are reserved.

Joint A/N feedback—explicit signaling: In this embodiment, it is assumed that a UE is explicitly signaled through higher layer signaling to use joint HARQ A/N feedback for multiple PDSCH transmission over multiple TRPs with multiple PDCCH. Each CORESET is configured with a higher layer configured index. CORESETs with the same higher layer index forms a CORESET group, the higher layer index is thus a CORESET group index. Each CORESET group is associated with one TRP. For two TRPs, two CORESET groups can be defined by using the higher layer index.

In this case, when two CORESET groups are configured for a UE in a CC, 2 TBs are used in type-1 HARQ-ACK codebook construction for the CC. In this case, if maxNrofCodeWordsScheduledByDCI=1 is configured, then only one TB field is needed in DCI format 1-1 and thus DCI overhead can be saved. When two PDSCHs, each carries one TB and with overlapping TDRA, are received in a slot the first and the second TB can be determined by the CORESET group index of a CORESET over which the corresponding PDCCH is received. For example, the first TB is associated with a PDSCH scheduled by a PDCCH received in a CORESET with a first CORESET group index while the second TB is associated with a PDSCH scheduled by a PDCCH received in a CORESET with a second CORESET group index.

Figure 17:
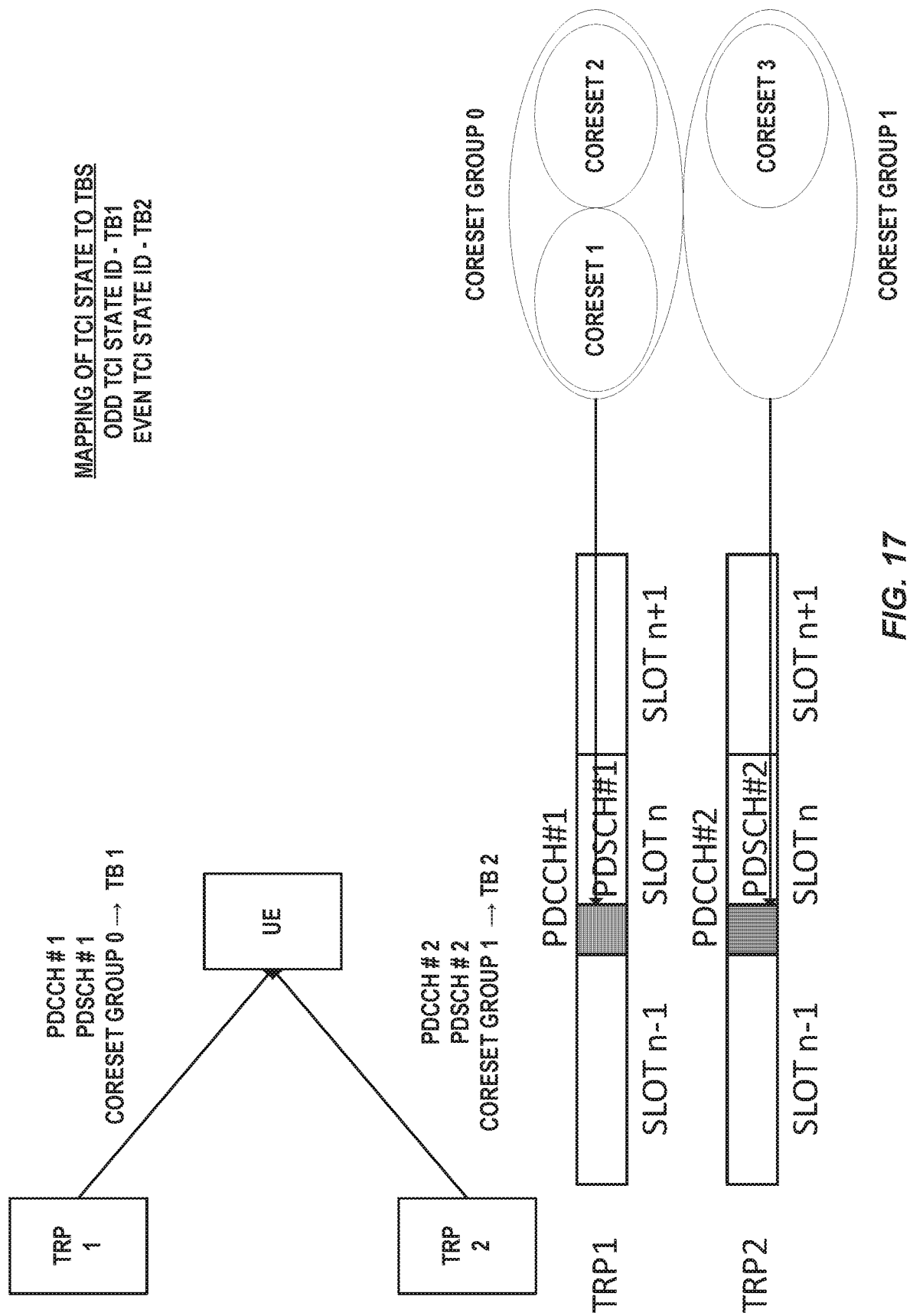
FIG. 17 illustrates two CORESET groups defined by higher layer signaling indices, according to some embodiments of the present disclosure.

An example is shown in FIG. 17, where two CORESET groups are defined by the higher layer signaling indices. Since PDCCH #1 is received in CORESET 1, which belongs to CORESET group 0, the first TB (TB 1) is thus associated with PDSCH #1. Similarly, PDCCH #2 is received in CORESET 3, which belongs to CORESET group 1, the second TB (TB 2) is then associated with PDSCH #2.

If maxNrofCodeWordsScheduledByDCI=2 is configured and only one PDCCH is received scheduling a PDSCH with two codewords, the NR Rel-15 behavior of mapping the TB feedback to positions in the HARQ codebook is used. If maxNrofCodeWordsScheduledByDCI=2 is configured and one PDCCH is received scheduling a PDSCH with one TB enabled, in one embodiment, the NR Rel-15 behavior of mapping the TB feedback to positions in the HARQ codebook is used. Alternatively, the first or the second TB is determined by the CORESET group index of a CORESET over which the corresponding PDCCH is received.

If one CORESET group is configured, then the number of TBs for type-1 HARQ-ACK codebook construction is determined according to the MIMO configuration maxNrofCodeWordsScheduledByDCI and legacy NR Rel-15 behavior applies.

Figure 18:
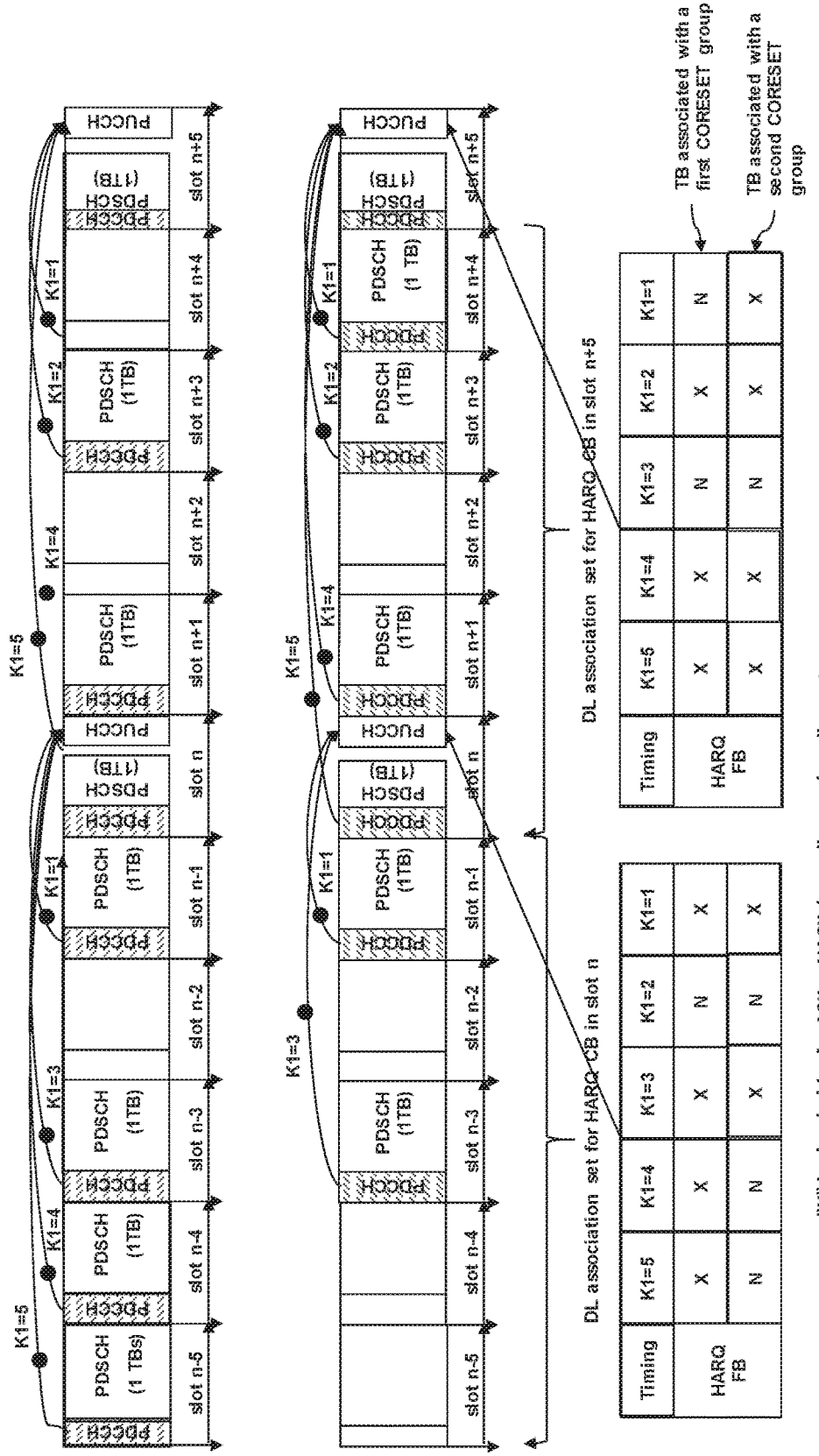
FIG. 18 illustrates a cell configured with one TB and two CORESET groups, according to some embodiments of the present disclosure.

An example is shown in FIG. 18, where the cell is configured with one TB (i.e., maxNrofCodeWordsScheduledByDCI=1) and two CORESET groups. The HARQ-ACK codebook consists of two rows (note, this is for illustration, the real codebook is a long bit vector), each associated with TBs scheduled by PDCCHs received in one of the two CORESET groups.

Figure 19:
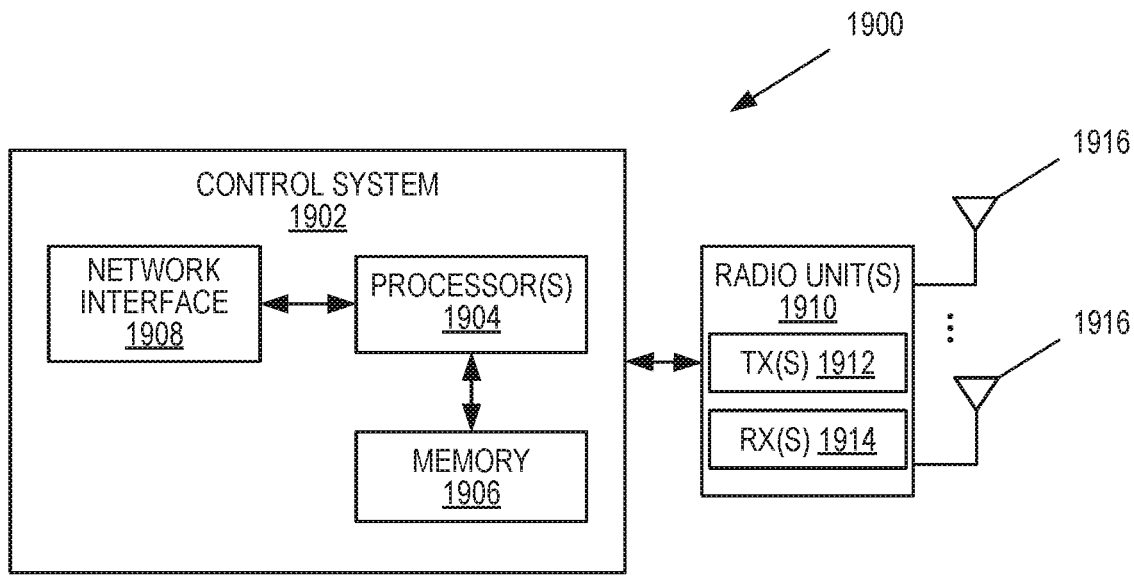
FIG. 19 illustrates one embodiment of a User Equipment (UE), according to some embodiments of the present disclosure.

FIG. 19 is a schematic block diagram of a radio access node 1900 according to some embodiments of the present disclosure. The radio access node 1900 may be, for example, a base station 1002 or 1006. As illustrated, the radio access node 1900 includes a control system 1902 that includes one or more processors 1904 (e.g., Central Processing Units (CPUs), Application Specific Integrated Circuits (ASICs), Field Programmable Gate Arrays (FPGAs), and/or the like), memory 1906, and a network interface 1908. The one or more processors 1904 are also referred to herein as processing circuitry. In addition, the radio access node 1900 includes one or more radio units 1910 that each includes one or more transmitters 1912 and one or more receivers 1914 coupled to one or more antennas 1916. The radio units 1910 may be referred to or be part of radio interface circuitry. In some embodiments, the radio unit(s) 1910 is external to the control system 1902 and connected to the control system 1902 via, e.g., a wired connection (e.g., an optical cable). However, in some other embodiments, the radio unit(s) 1910 and potentially the antenna(s) 1916 are integrated together with the control system 1902. The one or more processors 1904 operate to provide one or more functions of a radio access node 1900 as described herein. In some embodiments, the function(s) are implemented in software that is stored, e.g., in the memory 1906 and executed by the one or more processors 1904.

Figure 20:
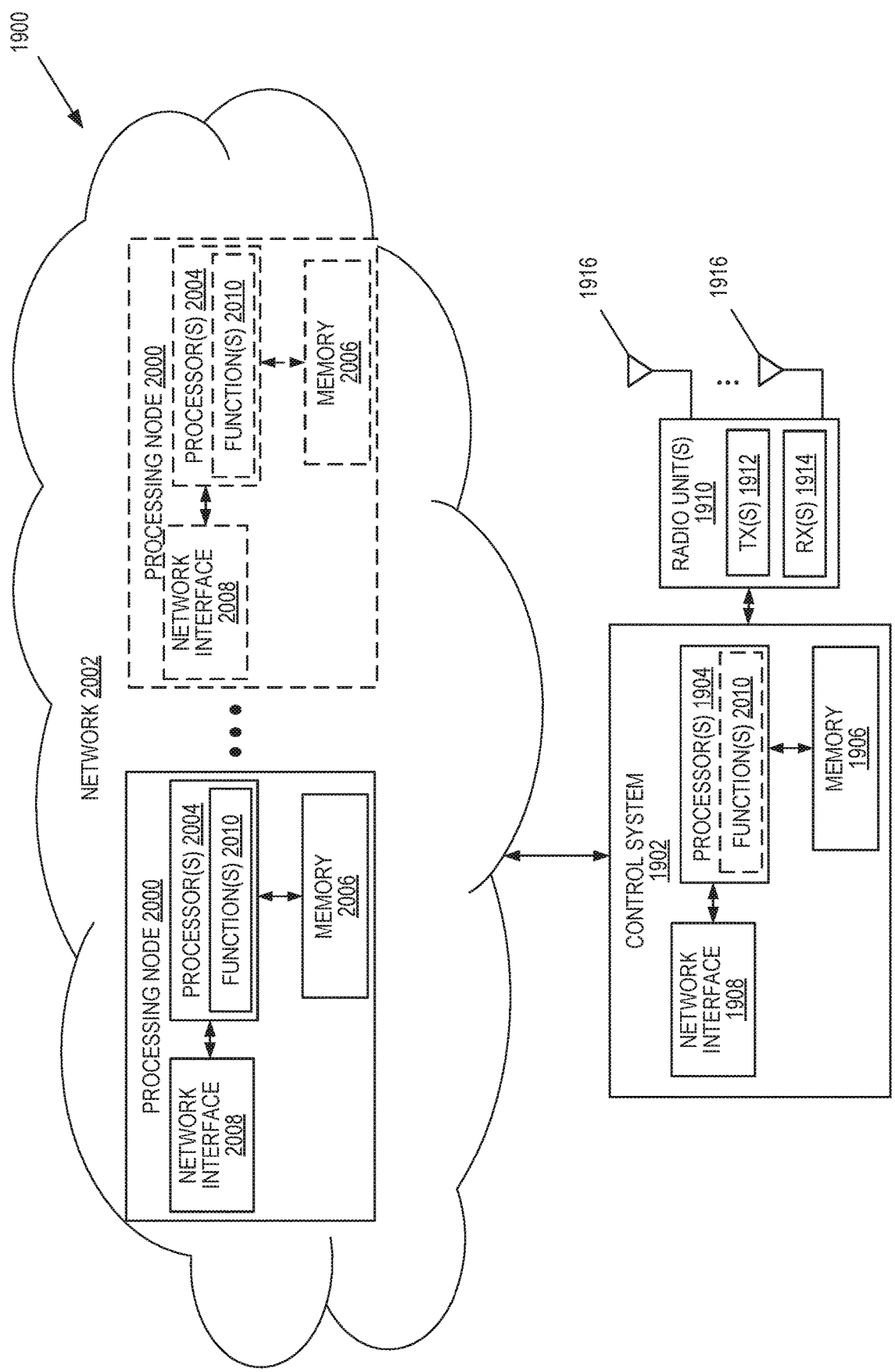
FIG. 20 is a schematic block diagram illustrating a virtualization environment in which functions implemented by some embodiments may be virtualized, according to some embodiments of the present disclosure.

FIG. 20 is a schematic block diagram that illustrates a virtualized embodiment of the radio access node 1900 according to some embodiments of the present disclosure. This discussion is equally applicable to other types of network nodes. Further, other types of network nodes may have similar virtualized architectures.

As used herein, a "virtualized" radio access node is an implementation of the radio access node 1900 in which at least a portion of the functionality of the radio access node 1900 is implemented as a virtual component(s) (e.g., via a virtual machine(s) executing on a physical processing node(s) in a network(s)). As illustrated, in this example, the radio access node 1900 includes the control system 1902 that includes the one or more processors 1904 (e.g., CPUs, ASICs, FPGAs, and/or the like), the memory 1906, and the network interface 1908 and the one or more radio units 1910 that each includes the one or more transmitters 1912 and the one or more receivers 1914 coupled to the one or more antennas 1916, as described above. The control system 1902 is connected to the radio unit(s) 1910 via, for example, an optical cable or the like. The control system 1902 is connected to one or more processing nodes 2000 coupled to or included as part of a network(s) 2002 via the network interface 1908. Each processing node 2000 includes one or more processors 2004 (e.g., CPUs, ASICs, FPGAs, and/or the like), memory 2006, and a network interface 2008.

In this example, functions 2010 of the radio access node 1900 described herein are implemented at the one or more processing nodes 2000 or distributed across the control system 1902 and the one or more processing nodes 2000 in any desired manner. In some particular embodiments, some or all of the functions 2010 of the radio access node 1900 described herein are implemented as virtual components executed by one or more virtual machines implemented in a virtual environment(s) hosted by the processing node(s) 2000. As will be appreciated by one of ordinary skill in the art, additional signaling or communication between the processing node(s) 2000 and the control system 1902 is used in order to carry out at least some of the desired functions 2010. Notably, in some embodiments, the control system 1902 may not be included, in which case the radio unit(s) 1910 communicate directly with the processing node(s) 2000 via an appropriate network interface(s).

In some embodiments, a computer program including instructions which, when executed by at least one processor, causes the at least one processor to carry out the functionality of radio access node 1900 or a node (e.g., a processing node 2000) implementing one or more of the functions 2010 of the radio access node 1900 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 21:
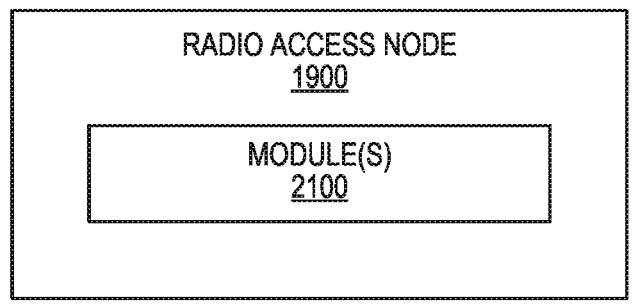
FIG. 21 illustrates an exemplary communication system, according to some embodiments of the present disclosure.

FIG. 21 is a schematic block diagram of the radio access node 1900 according to some other embodiments of the present disclosure. The radio access node 1900 includes one or more modules 2100, each of which is implemented in software. The module(s) 2100 provide the functionality of the radio access node 1900 described herein. This discussion is equally applicable to the processing node 2000 of FIG. 20 where the modules 2100 may be implemented at one of the processing nodes 2000 or distributed across multiple processing nodes 2000 and/or distributed across the processing node(s) 2000 and the control system 1902.

Figure 22:
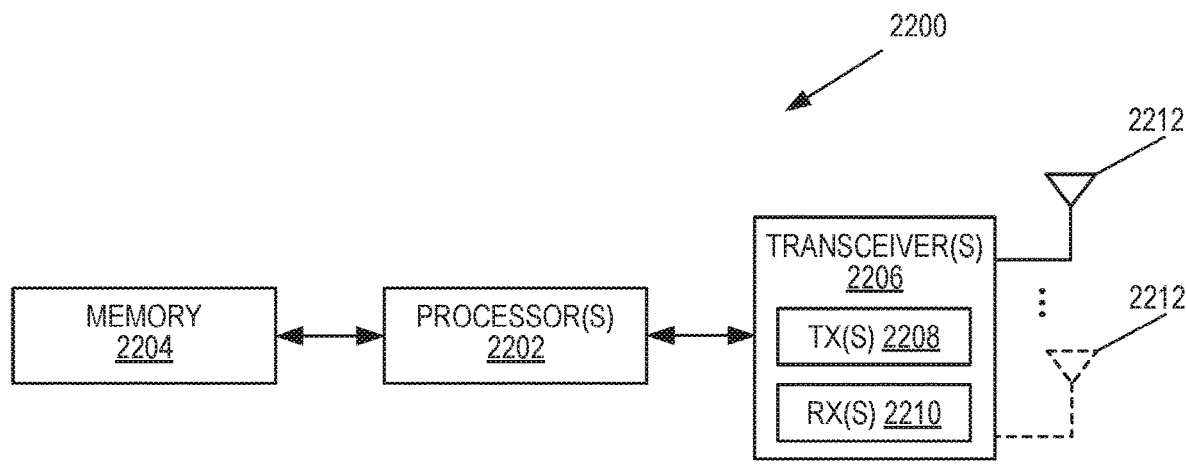
FIG. 22 illustrates example implementations, in accordance with an embodiment, of the UE, base station, and host computer of FIG. 21, according to some embodiments of the present disclosure.

FIG. 22 is a schematic block diagram of a UE 2200 according to some embodiments of the present disclosure. As illustrated, the UE 2200 includes one or more processors 2202 (e.g., CPUs, ASICs, FPGAs, and/or the like), memory 2204, and one or more transceivers 2206 each including one or more transmitters 2208 and one or more receivers 2210 coupled to one or more antennas 2212. The transceiver(s) 2206 includes radio-front end circuitry connected to the antenna(s) 2212 that is configured to condition signals communicated between the antenna(s) 2212 and the processor(s) 2202, as will be appreciated by on of ordinary skill in the art. The processors 2202 are also referred to herein as processing circuitry. The transceivers 2206 are also referred to herein as radio circuitry. In some embodiments, the functionality of the UE 2200 described above may be fully or partially implemented in software that is, e.g., stored in the memory 2204 and executed by the processor(s) 2202. Note that the UE 2200 may include additional components not illustrated in FIG. 22 such as, e.g., one or more user interface components (e.g., an input/output interface including a display, buttons, a touch screen, a microphone, a speaker(s), and/or the like and/or any other components for allowing input of information into the UE 2200 and/or allowing output of information from the UE 2200), a power supply (e.g., a battery and associated power circuitry), etc.

In some embodiments, a computer program including instructions which, when executed by at least one processor, causes the at least one processor to carry out the functionality of the UE 2200 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 23:
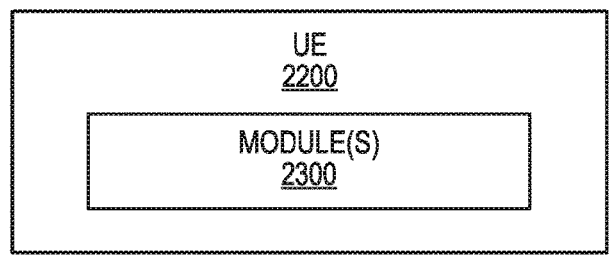

FIG. 23 is a schematic block diagram of the UE 2200 according to some other embodiments of the present disclosure. The UE 2200 includes one or more modules 2300, each of which is implemented in software. The module(s) 2300 provide the functionality of the UE 2200 described herein.

Figure 24:
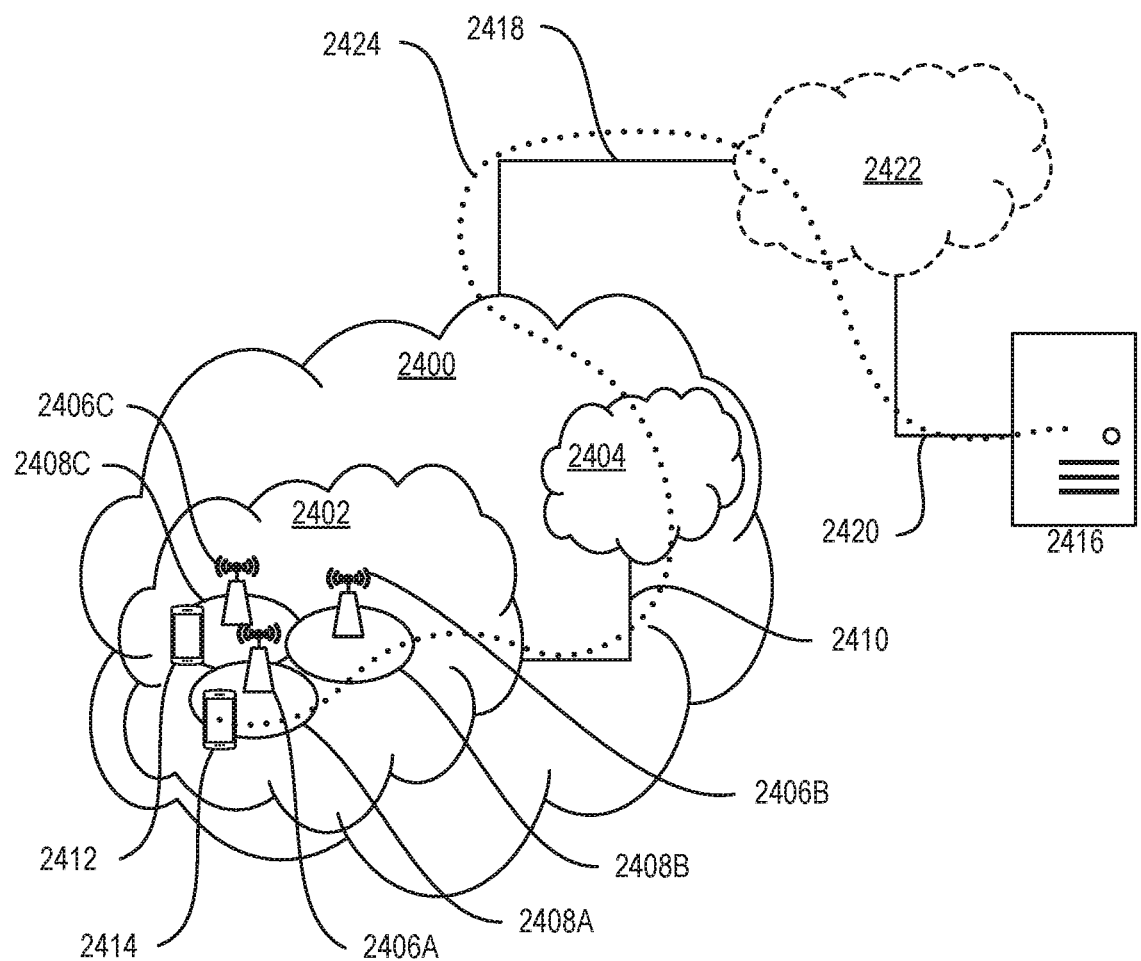

With reference to FIG. 24, in accordance with an embodiment, a communication system includes a telecommunication network 2400, such as a 3GPP-type cellular network, which comprises an access network 2402, such as a RAN, and a core network 2404. The access network 2402 comprises a plurality of base stations 2406A, 2406B, 2406C, such as NBs, eNBs, gNBs, or other types of wireless Access Points (APs), each defining a corresponding coverage area 2408A, 2408B, 2408C. Each base station 2406A, 2406B, 2406C is connectable to the core network 2404 over a wired or wireless connection 2410. A first UE 2412 located in coverage area 2408C is configured to wirelessly connect to, or be paged by, the corresponding base station 2406C. A second UE 2414 in coverage area 2408A is wirelessly connectable to the corresponding base station 2406A. While a plurality of UEs 2412, 2414 are illustrated in this example, the disclosed embodiments are equally applicable to a situation where a sole UE is in the coverage area or where a sole UE is connecting to the corresponding base station 2406.

The telecommunication network 2400 is itself connected to a host computer 2416, which may be embodied in the hardware and/or software of a standalone server, a cloud-implemented server, a distributed server, or as processing resources in a server farm. The host computer 2416 may be under the ownership or control of a service provider, or may be operated by the service provider or on behalf of the service provider. Connections 2418 and 2420 between the telecommunication network 2400 and the host computer 2416 may extend directly from the core network 2404 to the host computer 2416 or may go via an optional intermediate network 2422. The intermediate network 2422 may be one of, or a combination of more than one of, a public, private, or hosted network; the intermediate network 2422, if any, may be a backbone network or the Internet; in particular, the intermediate network 2422 may comprise two or more sub-networks (not shown).

The communication system of FIG. 24 as a whole enables connectivity between the connected UEs 2412, 2414 and the host computer 2416. The connectivity may be described as an Over-the-Top (OTT) connection 2424. The host computer 2416 and the connected UEs 2412, 2414 are configured to communicate data and/or signaling via the OTT connection 2424, using the access network 2402, the core network 2404, any intermediate network 2422, and possible further infrastructure (not shown) as intermediaries. The OTT connection 2424 may be transparent in the sense that the participating communication devices through which the OTT connection 2424 passes are unaware of routing of uplink and downlink communications. For example, the base station 2406 may not or need not be informed about the past routing of an incoming downlink communication with data originating from the host computer 2416 to be forwarded (e.g., handed over) to a connected UE 2412. Similarly, the base station 2406 need not be aware of the future routing of an outgoing uplink communication originating from the UE 2412 towards the host computer 2416.

Example implementations, in accordance with an embodiment, of the UE, base station, and host computer discussed in the preceding paragraphs will now be described with reference to FIG. 25. In a communication system 2500, a host computer 2502 comprises hardware 2504 including a communication interface 2506 configured to set up and maintain a wired or wireless connection with an interface of a different communication device of the communication system 2500. The host computer 2502 further comprises processing circuitry 2508, which may have storage and/or processing capabilities. In particular, the processing circuitry 2508 may comprise one or more programmable processors, ASICs, FPGAs, or combinations of these (not shown) adapted to execute instructions. The host computer 2502 further comprises software 2510, which is stored in or accessible by the host computer 2502 and executable by the processing circuitry 2508. The software 2510 includes a host application 2512. The host application 2512 may be operable to provide a service to a remote user, such as a UE 2514 connecting via an OTT connection 2516 terminating at the UE 2514 and the host computer 2502. In providing the service to the remote user, the host application 2512 may provide user data which is transmitted using the OTT connection 2516.

The communication system 2500 further includes a base station 2518 provided in a telecommunication system and comprising hardware 2520 enabling it to communicate with the host computer 2502 and with the UE 2514. The hardware 2520 may include a communication interface 2522 for setting up and maintaining a wired or wireless connection with an interface of a different communication device of the communication system 2500, as well as a radio interface 2524 for setting up and maintaining at least a wireless connection 2526 with the UE 2514 located in a coverage area (not shown in FIG. 25) served by the base station 2518. The communication interface 2522 may be configured to facilitate a connection 2528 to the host computer 2502. The connection 2528 may be direct or it may pass through a core network (not shown in FIG. 25) of the telecommunication system and/or through one or more intermediate networks outside the telecommunication system. In the embodiment shown, the hardware 2520 of the base station 2518 further includes processing circuitry 2530, which may comprise one or more programmable processors, ASICs, FPGAs, or combinations of these (not shown) adapted to execute instructions. The base station 2518 further has software 2532 stored internally or accessible via an external connection.

The communication system 2500 further includes the UE 2514 already referred to. The UE's 2514 hardware 2534 may include a radio interface 2536 configured to set up and maintain a wireless connection 2526 with a base station serving a coverage area in which the UE 2514 is currently located. The hardware 2534 of the UE 2514 further includes processing circuitry 2538, which may comprise one or more programmable processors, ASICs, FPGAs, or combinations of these (not shown) adapted to execute instructions. The UE 2514 further comprises software 2540, which is stored in or accessible by the UE 2514 and executable by the processing circuitry 2538. The software 2540 includes a client application 2542. The client application 2542 may be operable to provide a service to a human or non-human user via the UE 2514, with the support of the host computer 2502. In the host computer 2502, the executing host application 2512 may communicate with the executing client application 2542 via the OTT connection 2516 terminating at the UE 2514 and the host computer 2502. In providing the service to the user, the client application 2542 may receive request data from the host application 2512 and provide user data in response to the request data. The OTT connection 2516 may transfer both the request data and the user data. The client application 2542 may interact with the user to generate the user data that it provides.

Figure 25:
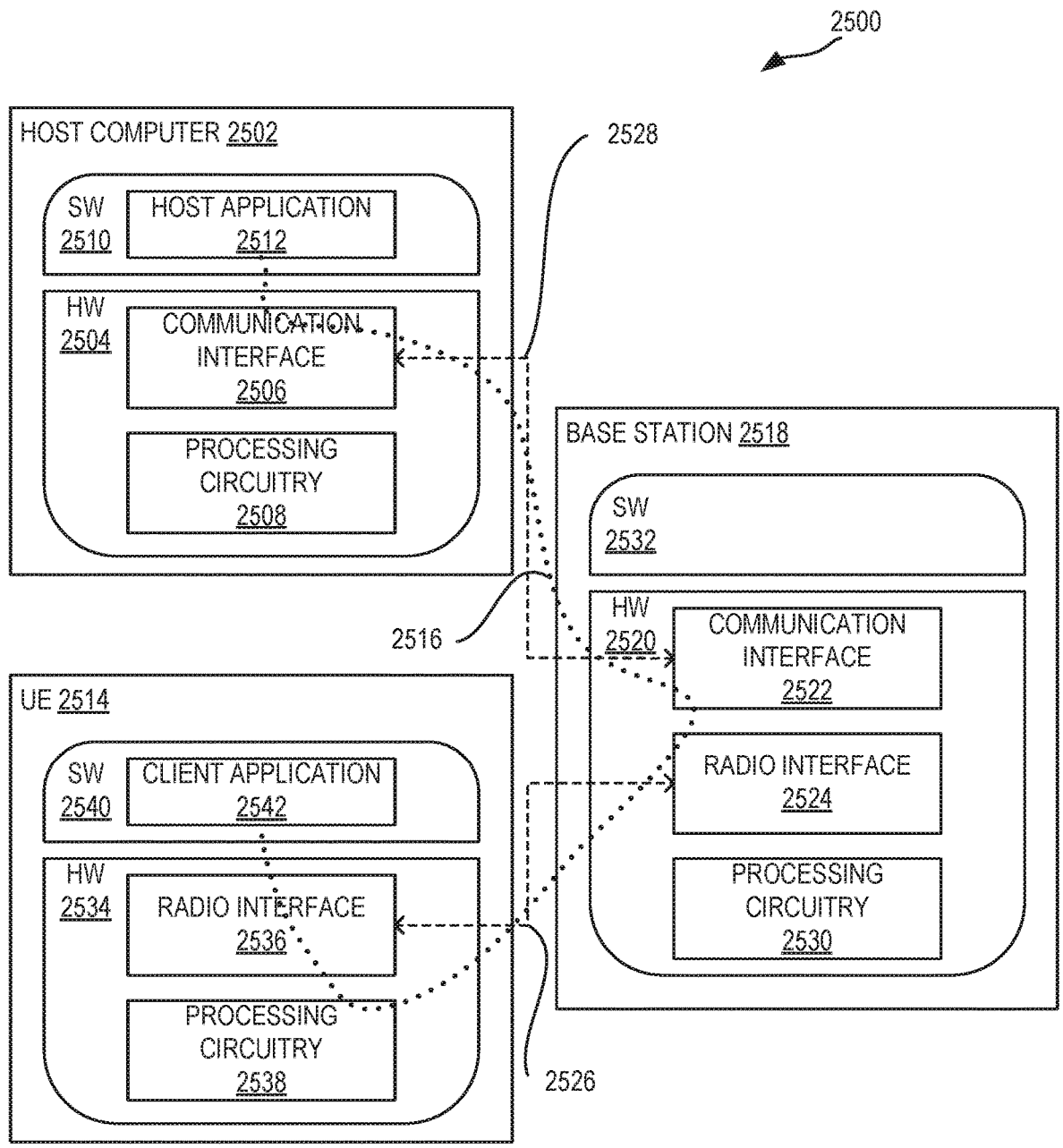

It is noted that the host computer 2502, the base station 2518, and the UE 2514 illustrated in FIG. 25 may be similar or identical to the host computer 2416, one of the base stations 2406A, 2406B, 2406C, and one of the UEs 2412, 2414 of FIG. 24, respectively. This is to say, the inner workings of these entities may be as shown in FIG. 25 and independently, the surrounding network topology may be that of FIG. 24.

In FIG. 25, the OTT connection 2516 has been drawn abstractly to illustrate the communication between the host computer 2502 and the UE 2514 via the base station 2518 without explicit reference to any intermediary devices and the precise routing of messages via these devices. The network infrastructure may determine the routing, which may be configured to hide from the UE 2514 or from the service provider operating the host computer 2502, or both. While the OTT connection 2516 is active, the network infrastructure may further take decisions by which it dynamically changes the routing (e.g., on the basis of load balancing consideration or reconfiguration of the network).

The wireless connection 2526 between the UE 2514 and the base station 2518 is in accordance with the teachings of the embodiments described throughout this disclosure. One or more of the various embodiments improve the performance of OTT services provided to the UE 2514 using the OTT connection 2516, in which the wireless connection 2526 forms the last segment. More precisely, the teachings of these embodiments may improve the e.g., data rate, latency, power consumption, etc. and thereby provide benefits such as e.g., reduced user waiting time, relaxed restriction on file size, better responsiveness, extended battery lifetime, etc.

A measurement procedure may be provided for the purpose of monitoring data rate, latency, and other factors on which the one or more embodiments improve. There may further be an optional network functionality for reconfiguring the OTT connection 2516 between the host computer 2502 and the UE 2514, in response to variations in the measurement results. The measurement procedure and/or the network functionality for reconfiguring the OTT connection 2516 may be implemented in the software 2510 and the hardware 2504 of the host computer 2502 or in the software 2540 and the hardware 2534 of the UE 2514, or both. In some embodiments, sensors (not shown) may be deployed in or in association with communication devices through which the OTT connection 2516 passes; the sensors may participate in the measurement procedure by supplying values of the monitored quantities exemplified above, or supplying values of other physical quantities from which the software 2510, 2540 may compute or estimate the monitored quantities. The reconfiguring of the OTT connection 2516 may include message format, retransmission settings, preferred routing, etc.; the reconfiguring need not affect the base station 2518, and it may be unknown or imperceptible to the base station 2518. Such procedures and functionalities may be known and practiced in the art. In certain embodiments, measurements may involve proprietary UE signaling facilitating the host computer 2502's measurements of throughput, propagation times, latency, and the like. The measurements may be implemented in that the software 2510 and 2540 causes messages to be transmitted, in particular empty or 'dummy' messages, using the OTT connection 2516 while it monitors propagation times, errors, etc.

FIG. 26 is a flowchart illustrating a method implemented in a communication system, in accordance with one embodiment. The communication system includes a host computer, a base station, and a UE which may be those described with reference to FIGS. 24 and 25. For simplicity of the present disclosure, only drawing references to FIG. 26 will be included in this section. In step 2600, the host computer provides user data. In sub-step 2602 (which may be optional) of step 2600, the host computer provides the user data by executing a host application. In step 2604, the host computer initiates a transmission carrying the user data to the UE. In step 2606 (which may be optional), the base station transmits to the UE the user data which was carried in the transmission that the host computer initiated, in accordance with the teachings of the embodiments described throughout this disclosure. In step 2608 (which may also be optional), the UE executes a client application associated with the host application executed by the host computer.

FIG. 27 is a flowchart illustrating a method implemented in a communication system, in accordance with one embodiment. The communication system includes a host computer, a base station, and a UE which may be those described with reference to FIGS. 24 and 25. For simplicity of the present disclosure, only drawing references to FIG. 27 will be included in this section. In step 2700 of the method, the host computer provides user data. In an optional sub-step (not shown) the host computer provides the user data by executing a host application. In step 2702, the host computer initiates a transmission carrying the user data to the UE. The transmission may pass via the base station, in accordance with the teachings of the embodiments described throughout this disclosure. In step 2704 (which may be optional), the UE receives the user data carried in the transmission.

FIG. 28 is a flowchart illustrating a method implemented in a communication system, in accordance with one embodiment. The communication system includes a host computer, a base station, and a UE which may be those described with reference to FIGS. 24 and 25. For simplicity of the present disclosure, only drawing references to FIG. 28 will be included in this section. In step 2800 (which may be optional), the UE receives input data provided by the host computer. Additionally or alternatively, in step 2802, the UE provides user data. In sub-step 2804 (which may be optional) of step 2800, the UE provides the user data by executing a client application. In sub-step 2806 (which may be optional) of step 2802, the UE executes a client application which provides the user data in reaction to the received input data provided by the host computer. In providing the user data, the executed client application may further consider user input received from the user. Regardless of the specific manner in which the user data was provided, the UE initiates, in sub-step 2808 (which may be optional), transmission of the user data to the host computer. In step 2810 of the method, the host computer receives the user data transmitted from the UE, in accordance with the teachings of the embodiments described throughout this disclosure.

FIG. 29 is a flowchart illustrating a method implemented in a communication system, in accordance with one embodiment. The communication system includes a host computer, a base station, and a UE which may be those described with reference to FIGS. 24 and 25. For simplicity of the present disclosure, only drawing references to FIG. 29 will be included in this section. In step 2900 (which may be optional), in accordance with the teachings of the embodiments described throughout this disclosure, the base station receives user data from the UE. In step 2902 (which may be optional), the base station initiates transmission of the received user data to the host computer. In step 2904 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.). Furthermore, throughout the disclosure, the term "embodiment" can be understood as replaced by the term "aspect".

EMBODIMENTS

Group A Embodiments

Embodiment 1: A method performed by a wireless device for providing transmission feedback, the method comprising: receiving a first Transport Block, TB, and a second TB; and determining the first TB and the second TB based on one or more of the group consisting of: i. a Demodulation Reference Signal, DMRS, Code Division Multiplexing, CDM, group identifier of one or more DMRS ports, optionally indicated in a corresponding Downlink Control Information, DCI, scheduling the TB; ii. a TB identifier, optionally indicated in a corresponding DCI scheduling the TB; iii. a Control Resource Set, CORESET, group identifier of a CORESET, optionally over which a corresponding DCI scheduling the TB is received; iv. a Transmission Configuration Indication, TCI, state identifier optionally indicated in a corresponding DCI scheduling the TB; v. a TCI state identifier of a CORESET optionally over which a corresponding DCI scheduling the TB is received; and vi. a scrambling identifier of a Physical Downlink Shared Channel, PDSCH, carrying the TB.

Embodiment 2: The method of embodiment 1 further comprising, prior to receiving the first TB and the second TB: receiving a configuration with a set of PDSCH-to-Hybrid Automatic Repeat Request, HARQ-feedback timing, K1, values and/or a list of PDSCH time domain resource allocations per slot in a serving cell.

Embodiment 3: The method of any of embodiments 1 to 2 further comprising, prior to receiving the first TB and the second TB: receiving an indication to allocate two entries, a first entry and a second entry, in a type-1 HARQ codebook for each of the configured K1 values and each set of overlapping PDSCH time domain resource assignments.

Embodiment 4: The method of any of embodiments 1 to 3 further comprising: mapping a HARQ-ACK bit for the first TB to the first entry and a HARQ-ACK bit for the second TB to the second entry in the Type-1 HARQ-ACK codebook associated with the same K1 value and the same time domain resource allocation.

Embodiment 5: The method of any of embodiments 1 to 4 further comprising: reporting the constructed Type-1 HARQ codebook.

Embodiment 6: The method of any of embodiments 1 to 5 wherein receiving the first TB and the second TB comprises receiving in a slot the first TB, from a first TRP and the second TB from a second TRP, wherein the first and the second TB are scheduled with two DCIs, one for each TB, and with a same time domain resource allocation and a same K1 value.

Embodiment 7: The method of any of embodiments 3 to 6 wherein receiving the indication to allocate two entries can be either explicitly or implicitly.

Embodiment 8: The method of embodiment 7 wherein receiving the indication to allocate two entries comprises: receiving one or more of: a. a higher layer parameter maxNrofCodeWordsScheduledByDCI=2; b. a higher layer parameter indicating joint HARQ Ack feedback and a configuration of two CORESET groups each with a different group identifier value per CORESET for HARQ-Ack reporting; c. a configuration of one CORESET group each with a same group identifier value per CORESET for HARQ-Ack reporting.

Embodiment 9: The method of any of embodiments 1 to 8 wherein the first or the second entry is filled with NACK if the first or the second TB is not received, respectively.

Embodiment 10: The method of any of embodiments 1 to 9 wherein the transmitting may further comprise transmitting one or two TBs scheduled by a single DCI.

Embodiment 11: The method of any of embodiments 1 to 10 wherein the first TB corresponds to transport block 1 and the second TB corresponds to transport block 2 as indicated in the DCI.

Embodiment 12: The method of any of embodiments 1 to 11 wherein the wireless device is a New Radio, NR, User Equipment, UE.

Embodiment 13: The method of any of the previous embodiments, further comprising: providing user data; and forwarding the user data to a host computer via the transmission to the base station.

Group B Embodiments

Embodiment 14: A method performed by a base station for receiving transmission feedback, the method comprising: transmitting, to a wireless device, a first Transport Block, TB, and a second TB; and receiving, from the wireless device, a constructed Type-1 Hybrid Automatic Repeat Request, HARQ, codebook.

Embodiment 15: The method of embodiment 14 further comprising, prior to transmitting the first TB and the second TB: transmitting, to the wireless device, a configuration with a set of PDSCH-to-HARQ-feedback timing, K1, values and/or a list of PDSCH time domain resource allocations per slot in a serving cell.

Embodiment 16: The method of any of embodiments 14 to 15 further comprising, prior to transmitting the first TB and the second TB: transmitting, to the wireless device, an indication to allocate two entries, a first entry and a second entry, in a type-1 HARQ codebook for each of the configured K1 values and each set of overlapping PDSCH time domain resource assignments.

Embodiment 17: The method of any of embodiments 14 to 16 wherein transmitting the first TB and the second TB comprises transmitting in a slot the first TB, from a first TRP and the second TB from a second TRP, wherein the first and the second TB are scheduled with two DCIs, one for each TB, and with a same time domain resource allocation and a same K1 value.

Embodiment 18: The method of any of embodiments 14 to 17 wherein transmitting the indication to allocate two entries can be either explicitly or implicitly.

Embodiment 19: The method of embodiment 18 wherein transmitting the indication to allocate two entries comprises: transmitting one or more of: a. a higher layer parameter maxNrofCodeWordsScheduledByDCI=2; b. a higher layer parameter indicating joint HARQ Ack feedback and a configuration of two CORESET groups each a different group identifier value per CORESET for HARQ-Ack reporting; c. a configuration of one CORESET group each with a same group identifier value per CORESET for HARQ-Ack reporting.

Embodiment 20: The method of any of embodiments 14 to 19 wherein the first or the second entry is filled with NACK if the first or the second TB is not received, respectively.

Embodiment 21: The method of any of embodiments 14 to 20 wherein the transmitting may further comprise transmitting one or two TBs scheduled by a single DCI.

Embodiment 22: The method of any of embodiments 14 to 21 wherein the first TB corresponds to transport block 1 and the second TB corresponds to transport block 2 as indicated in the DCI.

Embodiment 23: The method of any of embodiments 14 to 22 wherein the base station is a New Radio, NR, gNB.

Embodiment 24: The method of any of the previous embodiments, further comprising: obtaining user data; and forwarding the user data to a host computer or a wireless device.

Group C Embodiments

Embodiment 25: A wireless device for providing transmission feedback, the wireless device comprising: processing circuitry configured to perform any of the steps of any of the Group A embodiments; and power supply circuitry configured to supply power to the wireless device.

Embodiment 26: A base station for receiving transmission feedback, the base station comprising: processing circuitry configured to perform any of the steps of any of the Group B embodiments; and power supply circuitry configured to supply power to the base station.

Embodiment 27: A User Equipment, UE, for providing transmission feedback, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 28: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group B embodiments.

Embodiment 29: The communication system of the previous embodiment further including the base station.

Embodiment 30: The communication system of the previous 2 embodiments, further including the UE, wherein the UE is configured to communicate with the base station.

Embodiment 31: The communication system of the previous 3 embodiments, wherein: the processing circuitry of the host computer is configured to execute a host application, thereby providing the user data; and the UE comprises processing circuitry configured to execute a client application associated with the host application.

Embodiment 32: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group B embodiments.

Embodiment 33: The method of the previous embodiment, further comprising, at the base station, transmitting the user data.

Embodiment 34: The method of the previous 2 embodiments, wherein the user data is provided at the host computer by executing a host application, the method further comprising, at the UE, executing a client application associated with the host application.

Embodiment 35: A User Equipment, UE, configured to communicate with a base station, the UE comprising a radio interface and processing circuitry configured to perform the method of the previous 3 embodiments.

Embodiment 36: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 37: The communication system of the previous embodiment, wherein the cellular network further includes a base station configured to communicate with the UE.

Embodiment 38: The communication system of the previous 2 embodiments, wherein: the processing circuitry of the host computer is configured to execute a host application, thereby providing the user data; and the UE's processing circuitry is configured to execute a client application associated with the host application.

Embodiment 39: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 40: The method of the previous embodiment, further comprising at the UE, receiving the user data from the base station.

Embodiment 41: A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of the Group A embodiments.

Embodiment 42: The communication system of the previous embodiment, further including the UE.

Embodiment 43: The communication system of the previous 2 embodiments, further including the base station, wherein the base station comprises a radio interface configured to communicate with the UE and a communication interface configured to forward to the host computer the user data carried by a transmission from the UE to the base station.

Embodiment 44: The communication system of the previous 3 embodiments, wherein: the processing circuitry of the host computer is configured to execute a host application; and the UE's processing circuitry is configured to execute a client application associated with the host application, thereby providing the user data.

Embodiment 45: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 46: A method implemented in a communication system including a host computer, a base station, and a User Equipment, UE, the method comprising: at the host computer, receiving user data transmitted to the base station from the UE, wherein the UE performs any of the steps of any of the Group A embodiments.

Embodiment 47: The method of the previous embodiment, further comprising, at the UE, providing the user data to the base station.

Embodiment 48: The method of the previous 2 embodiments, further comprising: at the UE, executing a client application, thereby providing the user data to be transmitted; and at the host computer, executing a host application associated with the client application.

Embodiment 49: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 50: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 51: The communication system of the previous embodiment further including the base station.

Embodiment 52: The communication system of the previous 2 embodiments, further including the UE, wherein the UE is configured to communicate with the base station.

Embodiment 53: The communication system of the previous 3 embodiments, wherein: the processing circuitry of the host computer is configured to execute a host application; and the UE is configured to execute a client application associated with the host application, thereby providing the user data to be received by the host computer.

Embodiment 54: A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group A embodiments.

Embodiment 55: The method of the previous embodiment, further comprising at the base station, receiving the user data from the UE.

Embodiment 56: The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
ACK Acknowledgement
AF Application Function
AMF Access and Mobility Function
AN Access Network
AP Access Point
ASIC Application Specific Integrated Circuit
AUSF Authentication Server Function
CA Carrier Aggregation
CBG Code Block Group
CC Component Carrier
CCE Control Channel Element
CDM Code Division Multiplexing
CORESET Control Resource Set
CP-OFDM Cyclic Prefix-Orthogonal Frequency Division Multiplexing
CPU Central Processing Unit
CRC Cyclic Redundancy Check
C-RNTI Cell-Radio Network Temporary Identifier
CSI-RS Channel State Information Reference Signal
CS-RNTI Configured Scheduling-Radio Network Temporary Identifier
CSS Common Search Space
CW Codeword
DAI Downlink Assignment Index
DCI Downlink Control Information
DFT Discrete Fourier Transform
DL Downlink
DMRS Demodulation Reference Signal
DN Data Network
DSP Digital Signal Processor
eMBB Enhanced Mobile Broadband
eNB Enhanced or Evolved Node B
FPGA Field Programmable Gate Array
FR Frequency Range
gNB New Radio Base Station
HARQ Hybrid Automatic Repeat Request
HSS Home Subscriber Server
IE Information Element
IP Internet Protocol
LTE Long Term Evolution
MCS Modulation and Coding Scheme
MIMO Multiple Input Multiple Output
MME Mobility Management Entity
MTC Machine Type Communication
NC-JT Non-Coherent Joint Transmission
NDI New Data Indicator
NEF Network Exposure Function
NF Network Function
NR New Radio
NRF Network Function Repository Function
NSSF Network Slice Selection Function
OTT Over-the-Top
PCF Policy Control Function
PDCCH Physical Downlink Control Channel
PDSCH Physical Downlink Shared Channel
P-GW Packet Data Network Gateway
PRB Physical Resource Block
PRI PUCCH Resource Indicator
PUCCH Physical Uplink Control Channel
PUSCH Physical Uplink Shared Channel
QCL Quasi Co-Located
QoS Quality of Service
RAM Random Access Memory
RAN Radio Access Network
RB Resource Block
RE Resource Element
REG Resource Element Group
ROM Read Only Memory
RRC Radio Resource Control
RRH Remote Radio Head
RTT Round Trip Time
SCEF Service Capability Exposure Function
SINR Signal to Interference Plus Noise Ratio
SMF Session Management Function
SR Scheduling Request
SSB Synchronization Signal Block
TB Transport Block
TCI Transmission Configuration Indication
TDD Time Division Duplexing
TDM Time Division Multiplexing
TDRA Time Domain Resource Assignment
TPC Transmit Power Control
TRP Transmission Reception Point
TRS Tracking Reference Signal
UCI Uplink Control Information
UDM Unified Data Management
UE User Equipment
UL Uplink
UPF User Plane Function
USS UE Specific Search Space
VRB Virtual Resource Block
ZP Zero Power Those skilled in the art will recognize improvements and modifications to the embodiments of the present disclosure. All such improvements and modifications are considered within the scope of the concepts disclosed herein.

What is claimed is:

1. A method performed by a wireless device for enabling transmission feedback, the method comprising:
    receiving a configuration with a set of Physical Downlink Shared Channel, PDSCH-to-Hybrid Automatic Repeat Request, HARQ-feedback timing, K1, values and a list of PDSCH time domain resource allocations per slot in a serving cell;
    receiving an indication to allocate two entries, a first entry and a second entry, in a Type-1 HARQ-ACK codebook for each of the configured K1 values and each set of overlapping PDSCH time domain resource allocations, wherein receiving the indication to allocate the two entries can be either explicit or implicit;
    receiving a first Transport Block, TB, and a second TB in the serving cell;
    determining the first TB and the second TB based on a Control Resource Set, CORESET, group identifier of a CORESET over which a corresponding Downlink Control Information, DCI, scheduling the TB is received; and
    mapping a HARQ-ACK bit for the first TB to the first entry and a HARQ-ACK bit for the second TB to the second entry in the Type-1 HARQ-ACK codebook associated with a same K1 value and a same or overlapping PDSCH time domain resource allocation;
    wherein receiving the first TB and the second TB comprises receiving in a slot the first TB scheduled by a first DCI, from a first Transmission Reception Point, TRP, represented by a first CORESET group identifier and the second TB scheduled by a second DCI from a second TRP, represented by a second CORESET group identifier, wherein the first and the second TBs have a same or overlapping time domain resource allocation and a same K1 value.

2. The method of claim 1 further comprising: reporting the constructed Type-1 HARQ ACK codebook.

3. The method of claim 1 wherein receiving the indication to allocate the two entries comprises receiving one or more of the group consisting of:
- a higher layer parameter maxNrofCode WordsScheduledByDCI=2;
- a higher layer parameter indicating joint HARQ ACK feedback and a configuration of two CORESET groups each with a different group identifier value per CORESET for HARQ-ACK reporting; and
- a configuration of one CORESET group each with a same group identifier value per CORESET for HARQ-ACK reporting.

4. The method of claim 1 wherein the first or the second entry is filled with a Negative Acknowledgement, NACK, if the first or the second TB is not correctly received, respectively.

5. The method of claim 1 wherein the transmitting may further comprise transmitting one or two TBs scheduled by a single DCI.

6. The method of claim 1 wherein the first TB corresponds to transport block 1 and the second TB corresponds to transport block 2 as indicated in the single DCI.

7. The method of claim 1 wherein the wireless device is a New Radio, NR, User Equipment, UE.

8. A method performed by a base station for enabling transmission feedback, the method comprising:
- transmitting, to the wireless device, a configuration with a set of Physical Downlink Shared Channel, PDSCH-to-HARQ-feedback timing, K1, values and/or a list of PDSCH time domain resource allocations per slot in a serving cell;
- transmitting, to the wireless device, an indication to allocate two entries, a first entry and a second entry, in a type-1 HARQ codebook for each of the configured K1 values and each set of overlapping PDSCH time domain resource allocations, wherein transmitting the indication to allocate the two entries can be either explicit or implicit;
- transmitting, to a wireless device, a first Transport Block, TB, and a second TB, where the first TB and the second TB are determined based on a Control Resource Set, CORESET, group identifier of a CORESET over which a corresponding Downlink Control Information, DCI, scheduling the TB is transmitted; and
- receiving, from the wireless device, a constructed Type-1 Hybrid Automatic Repeat Request, HARQ, ACK codebook;
- wherein transmitting the first TB and the second TB comprises transmitting in the slot the first TB scheduled by a first DCI, from a first Transmission Reception Point, TRP, represented by a first CORESET group identifier and the second TB scheduled by a second DCI from a second TRP, represented by a second CORESET group identifier, wherein the first and the second TBs have a same or overlapping time domain resource allocation and a same K1 value.

9. The method of claim 8 wherein transmitting the indication to allocate the two entries comprises: transmitting one or more of the group consisting of:
- a higher layer parameter maxNrofCode WordsScheduledByDCI=2;
- a higher layer parameter indicating joint HARQ ACK feedback and a configuration of two CORESET groups each with a different group identifier value per CORESET for HARQ-ACK reporting;
- a configuration of one CORESET group each with a same group identifier value per CORESET for HARQ-ACK reporting.

10. The method of claim 8 wherein the first or the second entry is filled with a Negative Acknowledgement, NACK, if the first or the second TB is not correctly received, respectively.

11. The method of claim 8 wherein the transmitting may further comprise transmitting one or two TBs scheduled by a single DCI.

12. The method of claim 8 wherein the first TB corresponds to transport block 1 and the second TB corresponds to transport block 2 as indicated in the single DCI.

13. The method of claim 8 wherein the base station is a New Radio, NR, gNB.

14. A wireless device for enabling transmission feedback, the wireless device comprising:
- one or more processors; and
- memory storing instructions executable by the one or more processors, whereby the wireless device is operable to:
  - receive a configuration with a set of Physical Downlink Shared Channel, PDSCH-to-Hybrid Automatic Repeat Request, HARQ-feedback timing, K1, values and a list of PDSCH time domain resource allocations per slot in a serving cell;
  - receive an indication to allocate two entries, a first entry and a second entry, in a Type-1 HARQ-ACK codebook for each of the configured K1 values and each set of overlapping PDSCH time domain resource allocations, wherein receiving the indication to allocate the two entries can be either explicit or implicit;
  - receive a first Transport Block, TB, and a second TB in the serving cell;
  - determine the first TB and the second TB based on a Control Resource Set, CORESET, group identifier of a CORESET over which a corresponding Downlink Control Information, DCI, scheduling the TB is received; and
  - map a HARQ-ACK bit for the first TB to the first entry and a HARQ-ACK bit for the second TB to the second entry in the Type-1 HARQ-ACK codebook associated with a same K1 value and a same or overlapping PDSCH time domain resource allocation;
  - wherein receiving the first TB and the second TB comprises being operable to receive in a slot the first TB scheduled by a first DCI, from a first Transmission Reception Point, TRP, represented by a first CORESET group identifier and the second TB scheduled by a second DCI from a second TRP, represented by a second CORESET group identifier, wherein the first and the second TBs have a same or overlapping time domain resource allocation and a same K1 value.

15. The wireless device of claim 14 further operable to: report the constructed Type-1 HARQ ACK codebook.

16. The wireless device of claim 14 wherein receiving the indication to allocate the two entries comprises being operable to receive one or more of the group consisting of:
- a higher layer parameter maxNrofCode WordsScheduledByDCI=2;

a higher layer parameter indicating joint HARQ ACK feedback and a configuration of two CORESET groups each with a different group identifier value per CORESET for HARQ-ACK reporting; and a configuration of one CORESET group each with a same group identifier value per CORESET for HARQ-ACK reporting.

17. A base station for enabling transmission feedback, the base station comprising:

one or more processors; and memory comprising instructions to cause the base station to:

transmit, to the wireless device, a configuration with a set of Physical Downlink Shared Channel, PDSCH-to-HARQ-feedback timing, K1, values and/or a list of PDSCH time domain resource allocations per slot in a serving cell;

transmit, to the wireless device, an indication to allocate two entries, a first entry and a second entry, in a type-1 HARQ codebook for each of the configured K1 values and each set of overlapping PDSCH time domain resource allocations, wherein transmitting the indication to allocate the two entries can be either explicit or implicit;

transmit, to a wireless device, a first Transport Block, TB, and a second TB, where the first TB and the second TB are determined based on a Control Resource Set, CORESET, group identifier of a CORESET over which a corresponding Downlink Control Information, DCI, scheduling the TB is transmitted; and receive, from the wireless device, a constructed Type-1 Hybrid Automatic Repeat Request, HARQ, codebook;

wherein transmitting the first TB and the second TB comprises transmitting in the slot the first TB scheduled by a first DCI, from a first Transmission Reception Point, TRP, represented by a first CORESET group identifier and the second TB scheduled by a second DCI from a second TRP, represented by a second CORESET group identifier, wherein the first and the second TBs have a same or overlapping time domain resource allocation and a same K1 value.

18. The base station of claim 17 further operable to:

receive a report the constructed Type-1 HARQ ACK codebook.

19. The base station of claim 17 wherein transmitting the indication to allocate the two entries comprises being operable to transmit one or more of the group consisting of:

a higher layer parameter maxNrofCodeWordsScheduledByDCI=2;

a higher layer parameter indicating joint HARQ ACK feedback and a configuration of two CORESET groups each with a different group identifier value per CORESET for HARQ-ACK reporting; and a configuration of one CORESET group each with a same group identifier value per CORESET for HARQ-ACK reporting.

* * * * *